(12) United States Patent  
Ledvina et al.

(10) Patent No.: US 11,372,959 B2
(45) Date of Patent: *Jun. 28, 2022

(54) UNLOCKING A DEVICE

(71) Applicant: Apple Inc., Cupertino, CA (US)

(72) Inventors: Brent M. Ledvina, San Francisco, CA (US); David Benjamin Millman, Mountain View, CA (US); Johan Olav Bergerengen, San Francisco, CA (US); Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,563

(22) Filed: Sep. 4, 2019

(65) Prior Publication Data

US 2019/0394649 A1 Dec. 26, 2019

Related U.S. Application Data

(63) Continuation of application No. 15/272,892, filed on Sep. 22, 2016, now Pat. No. 10,440,574.

(Continued)

(51) Int. Cl.
*G06F 21/35* (2013.01)
*G06F 21/31* (2013.01)

(Continued)

(52) U.S. Cl.
CPC .............. *G06F 21/35* (2013.01); *G06F 21/31* (2013.01); *G06F 21/88* (2013.01); *H04W 12/06* (2013.01);

(Continued)

(58) Field of Classification Search
CPC ........ G06F 21/31; G06F 21/35; H04W 12/06; H04W 12/08; H04W 4/80; H04W 4/023
See application file for complete search history.

(56) References Cited

U.S. PATENT DOCUMENTS 8,385,227 B1   2/2013  Downey
8,826,415 B2   9/2014  Last
(Continued)

OTHER PUBLICATIONS

Youssef M, Youssef A, Rieger C, Shankar U, Agrawala A. Pinpoint: An asynchronous time-based location determination system. In Proceedings of the 4th international conference on Mobile systems, applications and services Jun. 19, 2006 (pp. 165-176). (Year: 2006).*

(Continued)

*Primary Examiner* — Robert B Leung
(74) *Attorney, Agent, or Firm* — Aikin & Gallant, LLP

(57) ABSTRACT

Techniques and systems for unlocking a first device based on signals transmitted between the first device and a second device are disclosed. A disclosed technique includes receiving, by a first device, at least one wireless signal from a second device; transmitting, by the first device, at least one wireless signal to the second device; determining, by the first device, transit times of the at least one received wireless signal and the at least one transmitted wireless signal; determining, by the first device, one or more range measurements between the first device and the second device based at least in part on the transit times; determining, by the first device, an unlock decision based at least in part on the one or more range measurements; and causing, by at least the first device, the first device to unlock if the unlock decision is positive.

20 Claims, 18 Drawing Sheets

Related U.S. Application Data

(60) Provisional application No. 62/348,995, filed on Jun. 12, 2016.

(51) Int. Cl.
  *H04W 12/06* (2021.01)
  *H04W 12/08* (2021.01)
  *G06F 21/88* (2013.01)
  *H04W 4/02* (2018.01)
  *H04W 4/80* (2018.01)

(52) U.S. Cl.
  CPC ............ *H04W 12/08* (2013.01); *H04W 4/023* (2013.01); *H04W 4/80* (2018.02)

(56) References Cited

U.S. PATENT DOCUMENTS

| | | | |
|---|---|---|---|
| 9,057,210 | B2 | 6/2015 | Dumas et al. |
| 9,520,045 | B2 | 12/2016 | Hawkins |
| 2005/0221798 | A1 | 10/2005 | Sengupta |
| 2007/0274375 | A1 | 11/2007 | Ray |
| 2010/0134276 | A1 | 6/2010 | Zaruba |
| 2010/0135178 | A1 | 6/2010 | Aggarwal |
| 2012/0016553 | A1* | 1/2012 | Bai .................. H04L 1/0002 701/31.5 |
| 2013/0121173 | A1 | 5/2013 | Chen |
| 2013/0237193 | A1* | 9/2013 | Dumas ............... G07C 9/00571 455/414.1 |
| 2013/0281084 | A1 | 10/2013 | Batada |
| 2014/0199967 | A1 | 7/2014 | Varoglu |
| 2014/0273963 | A1* | 9/2014 | Su ..................... G06F 21/44 455/411 |
| 2014/0337920 | A1 | 11/2014 | Giobbi |
| 2015/0048927 | A1* | 2/2015 | Simmons ........... G07C 9/00309 340/5.61 |
| 2015/0302188 | A1 | 10/2015 | Potbhare et al. |
| 2015/0310452 | A1 | 10/2015 | Baitch et al. |
| 2016/0014565 | A1* | 1/2016 | Segev .................. H04W 8/005 455/456.1 |
| 2016/0037346 | A1 | 2/2016 | Boettcher et al. |
| 2016/0048705 | A1 | 2/2016 | Yang et al. |
| 2016/0080936 | A1* | 3/2016 | Rachuri ............... H04W 12/33 726/7 |
| 2016/0131755 | A1 | 5/2016 | Wijbrans |
| 2017/0031003 | A1 | 2/2017 | Dougherty |
| 2017/0059701 | A1 | 3/2017 | Oh |
| 2017/0357788 | A1 | 12/2017 | Ledvina et al. |

OTHER PUBLICATIONS

A. Gunther and C. Hoene. Measuring Round Trip Times to Determine the Distance Between WLAN Nodes. Networking 2005, LNCS 3462, pp. 768-779. (Year: 2005).

J. Svecko et al. Distance estimation using RSSI and particle filter. ISA Transactions 55 (2015) 275-285 (Year: 2015).

M. Dakkak et al. Indoor localization method based on RTT and AOA using coordinates clustering. Computer Networks 55 (2011) 1794-1803. (Year: 2011).

M. Youssef et al. WLAN Location Determination via Clustering and Probability Distributions. Proceedings of the First IEEE International Conference on Pervasive Computing and Communications (2003) (Year: 2003).

G. Zanca et al. Experimental comparison of RSSI-based localization algorithms for indoor wireless sensor networks. REALWSN'08 (2008) (Year: 2008).

Cisco. Multipath and Diversity. Document ID 27147. Updated Jan. 21, 2008. Accessed on Jan. 31, 2019 at https://www.cisco.com/c/en/us/support/docs/wireless-mobility/wireless-lan-wlan/27147-multipath.html. 8 pages. (Year:2008).

\* cited by examiner

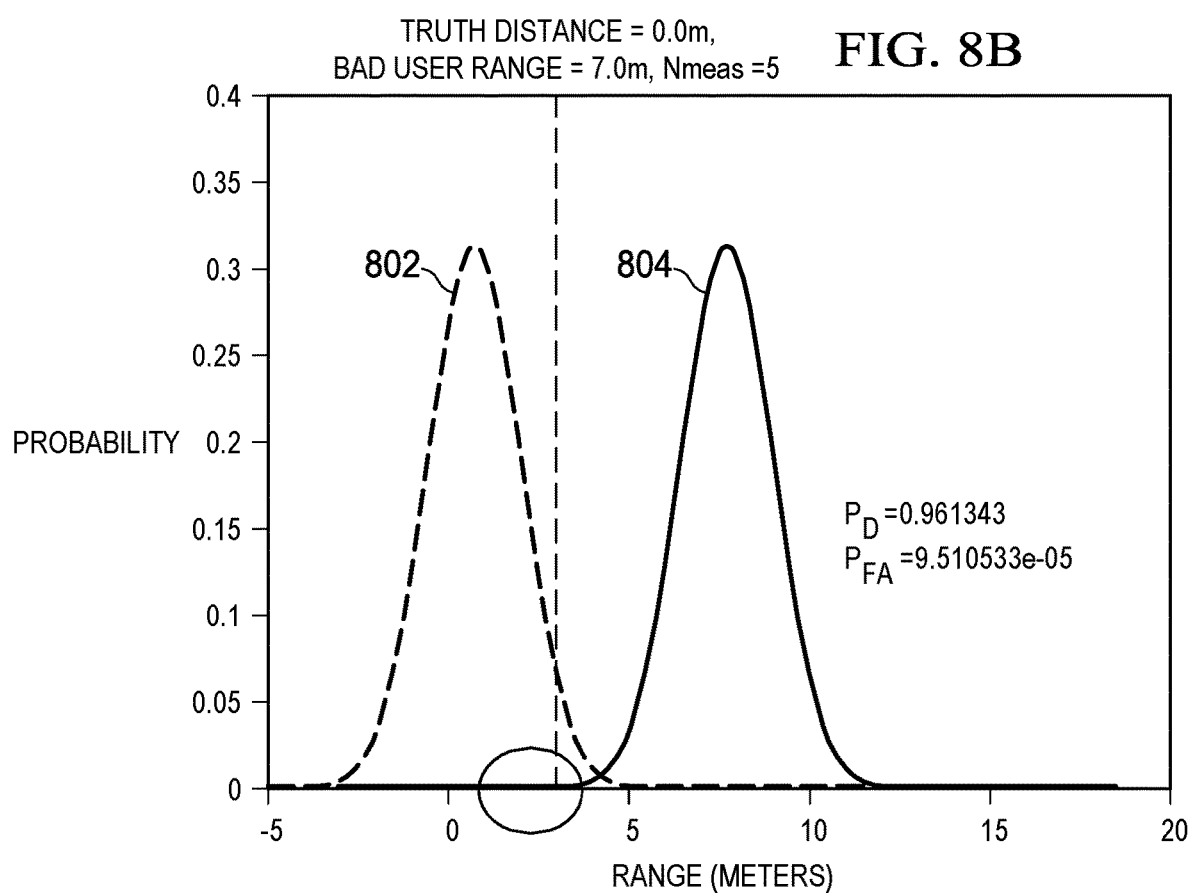

| BUBBLE SIZE (m) | POSITIVE SUCCESS RATE (DEVICES ARE CLOSE AND UNLOCK DECISION POSITIVE) | | NEGATIVE FAILURE RATE (DEVICES ARE FAR BUT UNLOCK DECISION POSITIVE) | |
|---|---|---|---|---|
| | 3 | 8 | 3 | 8 |
| 1.5 | 86.8% | 88.1% | 0.54% | <0.1% |
| 2.0 | 92.1% | 92.1% | 0.54% | <0.1% |
| 2.5 | 95.1% | 96.0% | 0.54% | <0.1% |
| 3.0 | 96.7% | 97.3% | 1.63% | 1.5% |
| 3.5 | 98.2% | 98.1% | 6.40% | 5.0% |
| 4.0 | 98.9% | 99.2% | 10.60% | 7.1% |
| 4.5 | 99.3% | 99.7% | 16.60% | 16.3% |

FIG. 8D

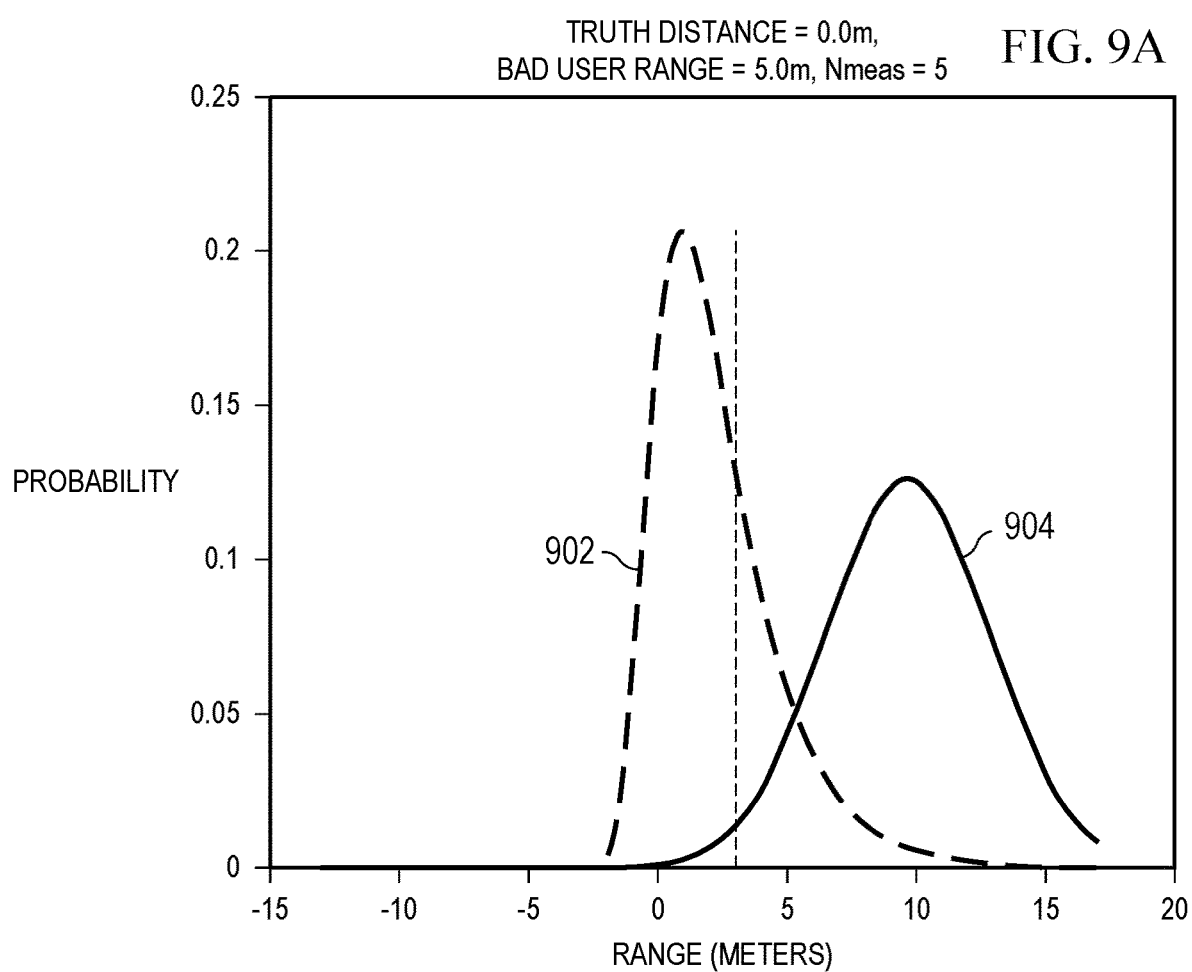

| BUBBLE SIZE (m) | POSITIVE SUCCESS RATE (DEVICES ARE CLOSE AND UNLOCK DECISION POSITIVE) | | NEGATIVE FAILURE RATE (DEVICES ARE FAR BUT UNLOCK DECISION POSITIVE) | |
|---|---|---|---|---|
| | 3 | 7 | 3 | 7 |
| 1.5 | 85.0% | 86.0% | <0.1% | <0.1% |
| 2.0 | 95.0% | 95.7% | <0.1% | 0.14% |
| 2.5 | 97.3% | 97.3% | 0.12% | 0.14% |
| 3.0 | 97.7% | 97.9% | 0.29% | 0.14% |
| 3.5 | 98.3% | 98.5% | 0.74% | 0.14% |
| 4.0 | 98.6% | 98.7% | 0.97% | 0.27% |
| 4.5 | 98.7% | 98.9% | 1.69% | 1.18% |

FIG. 9C

UNLOCKING A DEVICE

CLAIM OF PRIORITY

This application is a continuation of U.S. patent application Ser. No. 15/272,892, filed Sep. 22, 2016, which claims priority under 35 USC § 119(e) to U.S. patent application Ser. No. 62/348,995, filed on Jun. 12, 2016, both of which are hereby incorporated by reference.

TECHNICAL FIELD

The disclosure generally relates to techniques for unlocking a device.

BACKGROUND

Electronic devices typically include a locking mechanism to limit inputs and access to those authorized to use the particular device. One class of input that a locked device may respond to is a request to unlock the device. These inputs may involve known unlocking procedures, such as pressing a predefined set of buttons (e.g., simultaneously or sequentially) or entering a code or password, or other factors, or combinations of factors.

SUMMARY

In one aspect, in general, a method performed by a data processing apparatus includes receiving, by a first device, at least one wireless signal from a second device. The method also includes transmitting, by the first device, at least one wireless signal to the second device. The method also includes determining, by the first device, transit times of the at least one received wireless signal and the at least one transmitted wireless signal. The method also includes determining, by the first device, one or more range measurements between the first device and the second device based at least in part on the transit times. The method also includes determining, by the first device, an unlock decision based at least in part on the one or more range measurements. The method also includes causing, by at least the first device, the first device to unlock if the unlock decision is positive.

Implementations of these aspects may include one or more of the following features.

In some implementations, the method includes comparing, by the first device, at least one of the one or more range measurements to a range threshold.

In some implementations, the range threshold is a dynamic range threshold.

In some implementations, a value of the dynamic range threshold is based at least in part on a type of the first device, a type of the second device, a count of wireless signals received by the first device, a degree of conformity of the one or more range measurements to a model of range data, and one or more characteristics of an environment in which the first device and the second device are located.

In some implementations, the unlock decision is based at least in part on clustering of the one or more range measurements.

In some implementations, the unlock decision is based at least in part on an accuracy of the transit times.

In some implementations, the one or more range measurements are determined by a wireless controller of the first device.

In some implementations, the method includes determining, by the first device, that the second device is within a threshold range of the first device. The method also includes determining, by the first device, that the unlock decision is positive.

In some implementations, the unlock decision is based at least in part on one or more of a type of the first device, a type of the second device, a count of wireless signals received by the first device, a degree of conformity of the one or more range measurements to a model of range data, and one or more characteristics of an environment in which the first device and the second device are located.

In some implementations, the method includes filtering the at least one wireless signal received by the first device.

In some implementations, the at least one wireless signal received by the first device is filtered by a batch filter.

In some implementations, one or more characteristics of the batch filter are based on experimental data obtained from one or both of the first device and the second device.

In some implementations, the experimental data comprises a distribution of distance measurements between the first device and the second device.

In some implementations, the one or more characteristics of the batch filter are modeled such that one or both of false positive unlock decisions and false negative unlock decisions are minimized.

In some implementations, the one or more characteristics of the batch filter are modeled according to a maximum likelihood estimation methodology.

In some implementations, the one or more characteristics of the batch filter are modeled according to a generalized extreme value methodology.

In some implementations, the one or more characteristics of the batch filter are modeled based on an assumption that the one or more range measurements comprise at least a predetermined number of range measurements.

In some implementations, the at least one wireless signal received by the first device is filtered by sequential filters.

In some implementations, the at least one wireless signal received by the first device is pre-filtered before being filtered.

In some implementations, the pre-filtering removes outlier wireless signals of the at least one wireless signal received by the first device.

In some implementations, the at least one wireless signal is received by the first device as a first packet.

In some implementations, the first packet is encrypted according to a first encryption scheme.

In some implementations, the at least one wireless signal is transmitted by the first device as a second packet.

In some implementations, the second packet is encrypted according to a second encryption scheme.

In another aspect, in general, a computer system includes a computer readable storage device storing computer executable instructions. The computer system also includes a hardware processor configured to, in response to executing the computer executable instructions, carry out operations comprising: receiving at least one wireless signal from a device. The operations also comprise transmitting at least one wireless signal to the device. The operations also comprise determining transit times of the at least one received wireless signal and the at least one transmitted wireless signal. The operations also comprise determining one or more range measurements between the first device and the second device based at least in part on the transit times. The operations also comprise determining an unlock decision based at least in part on the one or more range measurements. The operations also comprise causing the computer system to unlock if the unlock decision is positive.

In another aspect, in general, a computer readable storage device storing computer executable instructions, when executed by a first device, causes a hardware processor of the first device to carry out operations comprising: receiving, by the first device, at least one wireless signal from a second device. The operations also comprise transmitting, by the first device, at least one wireless signal to the second device. The operations also comprise determining, by the first device, transit times of the at least one received wireless signal and the at least one transmitted wireless signal. The operations also comprise determining, by the first device, one or more range measurements between the first device and the second device based at least in part on the transit times. The operations also comprise determining, by the first device, an unlock decision based at least in part on the one or more range measurements. The operations also comprise causing, by at least the first device, the first device to unlock if the unlock decision is positive.

Particular implementations provide at least the following advantages:

In some implementations, interaction between the first device and the second device that results in a positive unlock decision allows an authorized user to access the first device without repetitive input of a code, password, or passphrase. That is, a user who is already determined to be an authorized user and who is within typical access range of the first device can unlock and access the first device with minimal or no user input.

In some implementation, the range required to yield a positive unlock decision may vary based on a number of factors. In some implementations, characteristics of the environment in which the first device and/or the second device reside may contribute to the threshold range that forms the decision boundary (e.g., the "unlock bubble") of the unlock decision. The decision boundary may be dynamically adjustable to fit the needs of the user. For example, the decision boundary may be designed to minimize false positives and/or false negatives as desired. In some implementations, the decision boundary may be adjusted depending on the reliability of the range measurements between the first device and the second device.

In some implementations, the range measurements between the first device and the second device are filtered to minimize or eliminate effects of wireless signals transmitted/received between the devices bouncing off of one or more reflectors before reaching their destination (e.g., multipath signals). The filter (e.g., a batch filter) can be modeled such that the raw range measurements are presented as a more accurate representation of the actual range between the first device and the second device. In some implementations, the filter may be modeled based on experimental data obtained from the first device and the second device under known use cases (e.g., use cases in which the expected result of the unlock decision and the "true" distance between the devices are known). In some implementations, the filter may be modeled in various environments in which the devices are expected to reside and in which an unlock decision is expected to be made.

Details of one or more implementations are set forth in the accompanying drawings and the description below. Other features, aspects, and potential advantages will be apparent from the description and drawings, and from the claims.

DESCRIPTION OF DRAWINGS

FIG. 8B illustrates an adjusted Generalized Extreme Value (GEV) model that was fit to the range measurements of FIG. 8A.

FIG. 8D shows a table that indicates positive success rates and negative failure rates for various range thresholds and measurement counts.

FIG. 9A illustrates an adjusted GEV model that was fit to range measurements corresponding to various experimental use cases.

FIG. 9C shows a table that indicates positive success rates and negative failure rates for various range threshold and measurements counts.

Like reference symbols in the various drawings indicate like elements.

DETAILED DESCRIPTION

Figure 1:
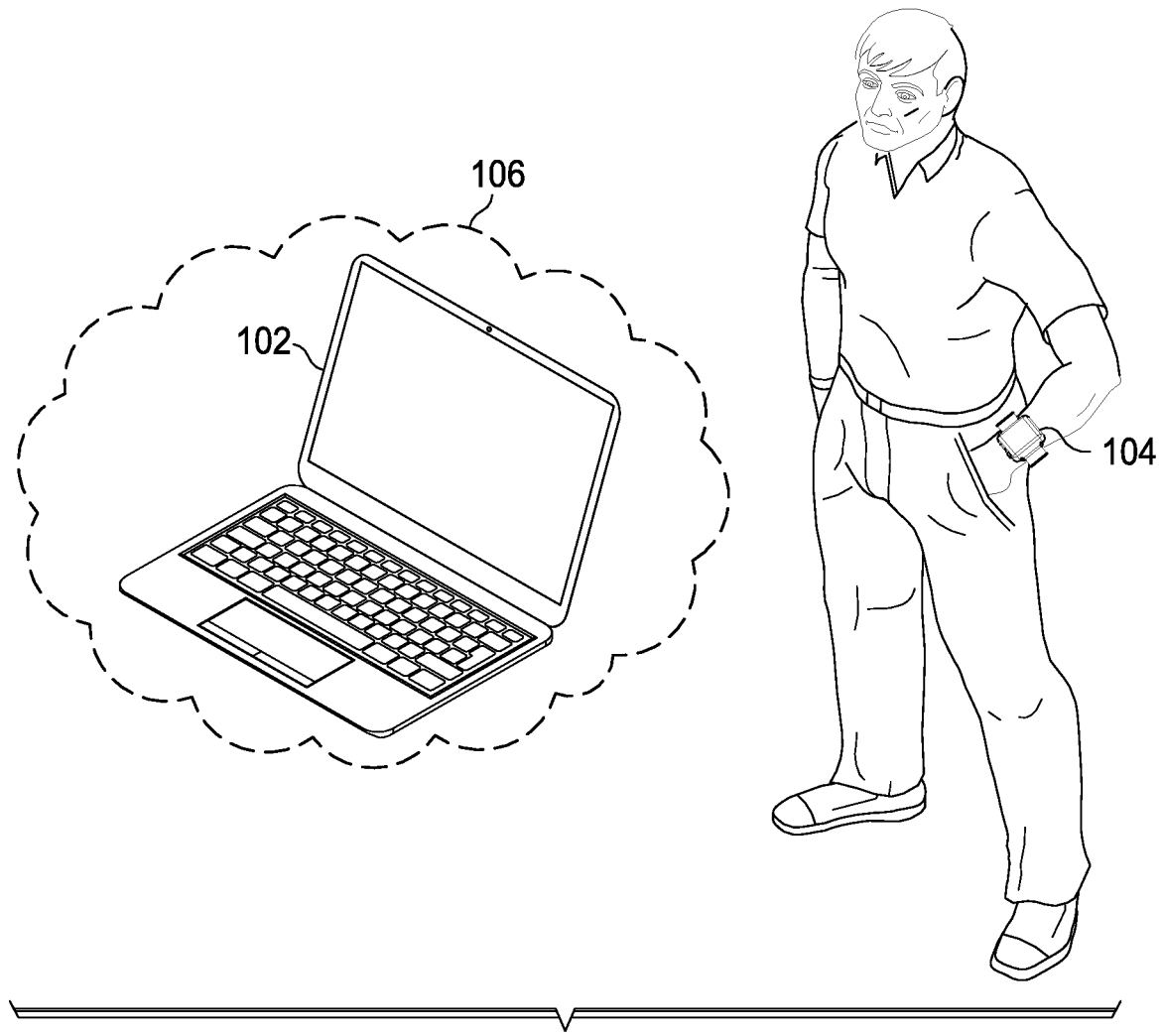
FIG. 1 illustrates an environment that includes a first device to be unlocked and a second device.

A first device (e.g., a laptop computer) and a second device (e.g., a wearable device such as a watch, a mobile phone, some other trusted device, etc.) are configured to communicate with each other using wireless communication. Based on characteristics of the wireless communication, such as the transit times (e.g., times-of-flight) of wireless signals transmitted between the devices, a plurality of range measurements are obtained. The range measurements, among other things, are used to determine whether the watch is within a "bubble" around the laptop. For example, the bubble may be defined by a predetermined radius around the laptop. In this example, the laptop can unlock only if the watch is determined to be within the laptop's bubble. In some implementations, unlocking the laptop requires user interaction such as a key press or opening of the laptop. In some implementations, a characteristic of the watch, such as the identity of the wearer of the watch, is considered before the laptop is unlocked. For example, the laptop may confirm that the wearer is authorized to access the laptop by determining whether the watch and the laptop are associated with the same credentials (e.g., iCloud® account) as part of a device discovery routine.

In some implementations, the determination of whether the watch is within the bubble may be based at least in part on characteristics of the environment in which the watch and laptop are located. For example, certain environments may call for adjustment (e.g., relaxation) of the bubble, for example, due to the wireless signals potentially bouncing off of walls (e.g., multipath signals). In some implementations, the determination may be based at least in part on a type of the first device. For example, if the first device is a desktop computer rather than a laptop, the bubble may be relaxed or constrained. In this way, the bubble may have a dynamic range threshold that varies based on one or more of characteristics of the particular environment, a type of the first device and/or the second device (e.g., a laptop, a desktop computer, a mobile phone, etc.), and a number of antennas and/or type of antenna switching employed.

In some implementations, the range measurements, among other things, are used to determine a range estimate between the laptop and the watch. The range estimate may be compared to a bubble threshold. If the threshold is satisfied, the laptop may unlock (or, e.g., the laptop may enter an unlockable state in which the laptop can be unlocked in response to user interaction). For example, one or more data packets may be transmitted between the laptop and the watch. The time-of-flight (e.g., TOF) of the transmissions can be measured and used to determine a plurality of range measurements (e.g., distance measurements in meters) between the devices. The range measurements are processed (e.g., passed to a batch filter) to determine a range estimate between the devices (e.g., also in meters). The range estimate represents an approximation of the distance between the laptop and the watch based on a number of factors. If the range estimate is within the bubble threshold, the laptop is unlocked. If the range estimate is outside of the bubble threshold, the laptop may remain locked and the process may revert back to making range measurements.

In some implementations, the range measurements, among other things, are used in a hypothesis test that estimates a probability (e.g., a likelihood) that the device is within the bubble. In some examples, the range measurements are not necessarily compared to a range threshold, but instead may be used to determine a probability that the devices are various distances apart (e.g., as a probability distribution). The probability distribution may then be used to determine a probability that the device is within the bubble, for example, by fitting the probability distribution to empirical data and determining a probability that the devices are within a particular range of each other.

FIG. 1 shows an environment that includes a first device 102 to be unlocked and a second device 104. A bubble 106 is defined around the first device 102. In this example, the first device 102 is a laptop and the second device 104 is a wearable device such as a watch that is worn by a user, although other devices may be used. The environment may be an enclosed space such as a bedroom or an office, or may alternatively be an open space such as an outdoor area. Based on characteristics of wireless communications between the laptop 102 and the watch 104, the laptop 102 determines whether the watch 104 is within the bubble 106. If the watch 104 is determined to be within the bubble 106, the laptop 102 makes a positive unlock decision, e.g., a decision that unlocking is appropriate, which unlocks the laptop 102. If the watch 104 is determined to be outside of the bubble 106, the laptop 102 may remain locked, e.g., in response to a negative unlock decision.

In some implementations, the bubble 106 may be characterized according to one or more predetermined criteria. For example, the bubble 106 may be defined by a predetermined radius around the laptop 102. In some implementations, the bubble 106 may be dynamic in nature. For example, the bubble 106 may be defined by a radius around the laptop 102 that changes based on one or more factors, such as characteristics of the environment, a type of the first device 102 and/or the second device 104, and characteristics of the wireless communication employed between the devices (e.g., a number of antennas and/or a type of antenna switching employed, among others). The ranging accuracy of the wireless waveforms transmitted between the devices may be based at least in part on the signal-to-noise ratio and/or the bandwidth used. The number of antennas and/or an antenna gain of each device may affect the signal-to-noise ratio and, in turn, the ranging accuracy. In some implementations, the ranging accuracy may also be based at least in part on an integration time used to generate range measurements. The bubble 106 may change based on one or more of the foregoing factors.

While the bubble 106 is shown in FIG. 1 as having a defined boundary that represents a radius around the laptop 102, the bubble 106 may instead be thought of as a decision boundary. That is, the bubble 106 may represent the boundary of the decision of whether the laptop 102 is to be unlocked or not. As described in more detail below, the unlock decision may be based at least in part on factors that are unrelated to the range (e.g., distance) between the laptop 102 and the watch 104. As such, while the watch 104 is shown as being outside of the bubble 106 in FIG. 1 (e.g., resulting in a negative unlock decision), the same watch 104 positioned at the same distance from the laptop 102 may result in a positive unlock decision under different circumstances (e.g., if different antenna switching were employed by the laptop 102). Under such circumstances, the representation of the bubble 106 may be represented as encompassing the watch 104.

Figure 2:
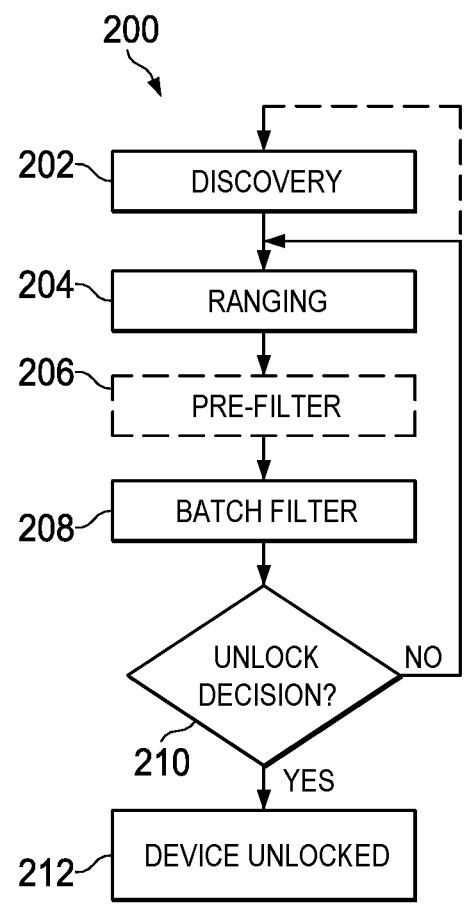
FIG. 2 is a flowchart of an exemplary process of unlocking the first device.

FIG. 2 is a flowchart of an exemplary process 200 of unlocking a device (e.g., the laptop 102 shown in FIG. 1). The process can be performed, for example, by the laptop 102, although in some implementations, the process can be performed by another device (e.g., such as the watch 104 shown in FIG. 1). In some implementations, a setting on the laptop 102 and/or the watch 104 must be enabled before the unlocking process 200 can commence. In some implementations, the laptop 102 and/or the watch 104 must be associated with common credentials (e.g., logged into the same iCloud® account) before the unlocking process 200 can commence. In some implementations, receipt of a user input by the laptop 102 and/or the watch 104 allows the process 200 to commence. For example, the process 200 may commence after receipt of a key press or the opening of the laptop 102. Such prerequisites may allow the laptop 102 and/or the watch 104 to conserve battery power.

The process 200 begins with discovery (202) between the laptop 102 and the watch 104 to confirm that the user of the watch 104 is authorized to access the laptop 102 and to determine whether sufficient signal connectivity exists for the laptop 102 and the watch 104 to communicate (e.g., based on strengths of the signals). Ranging (204) is then performed, which involves determining the distance between the laptop 102 and the watch 104. A plurality of range measurements between the laptop 102 and the watch 104 are taken. In some implementations, the range measurements are then pre-filtered (206) to remove outlier measurements before they are passed through a filter such as a batch filter (208). The batch filter (208) can filter the range measurements, and one or both of a range estimate of a distance between the laptop 102 and the watch 104 and a probability that the watch 104 is within the bubble 106 can be determined. An unlock decision (210) is then determined based on the output of the batch filtering (208). If the unlock decision (210) is positive, the laptop 102 is unlocked (212). If the unlock decision (210) is negative, the process 200 reverts back to discovery (202) or ranging (204) between the devices.

Figure 3:
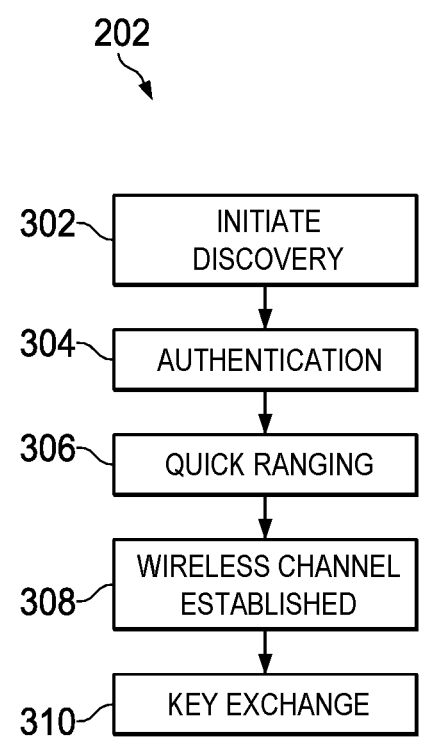
FIG. 3 is a flowchart of an exemplary discovery process performed between the first device and the second device.

FIG. 3 shows an exemplary discovery process (202) performed between the laptop 102 and the watch 104. Discovery may be initiated (302) upon the laptop 102 or the watch 104 receiving a user input. For example, the user may interact with a button on the watch 104 or an interactive touch screen on a display of the watch to cause discovery to commence. In some implementations, discovery may be initiated elsewhere, such as at the laptop 102. For example, the user may interact with a prompt on a log-in screen of the laptop 102 to indicate that unlocking via the watch 104 is desired.

An authentication step (304) can be used to verify that the user of the watch 104 is authorized to access the laptop 102 before the unlock process can proceed. For example, the laptop 102 may verify that the watch 104 and the laptop 102 belong to the same owner (e.g., the user described above with respect to FIG. 1). In some implementations, credentials of an account that corresponds to the watch 104 are compared to credentials of an account that corresponds to the laptop 102. For example, the credentials of the iCloud® account that the watch 104 is signed into can be compared to the credentials of the iCloud® account that the laptop 102 is signed into to confirm common ownership. In some implementations, the watch 104 is unlocked by the user (e.g., using a user interface of the watch 104) prior to or during the comparison of the account credentials. For example, the watch 104 may be unlocked shortly before or shortly after the authentication step (304) commences. In some implementations, the watch 104 may be unlocked a relatively longer amount of time before the authentication (304). For example, the watch 104 may be unlocked when the user puts on the watch 104, and the watch 104 may remain unlocked throughout uninterrupted wear by the user.

A quick ranging step (306) can be used after the initial discovery to verify that sufficient signal connectivity exists between the laptop 102 and the watch 104 for the unlock process to continue. For example, the laptop 102 may determine whether the watch 104 is within range of communication over a short-range communication technology such as Bluetooth (e.g., a Bluetooth observable determination). Pairing (e.g., using a Bluetooth pairing technique) of the laptop 102 and the watch 104 may be performed but is not required. In some implementations, the quick ranging (306) may be performed after discovery (202) and instead as an initial step in the ranging process (204).

A wireless channel is then established (308) between the laptop 102 and the watch 104. The wireless channel may be established over a peer-to-peer wireless direct link such as Apple® Wireless Direct Link (AWDL). A key exchange (310) then occurs. For example, the laptop 102 and the watch 104 exchange keys related to one of both of the AWDL channel and the ranging (204 shown in FIG. 2). In some implementations, the wireless channel being established (308) and the key exchange (310) steps are part of the quick ranging step (306) itself. The ranging (204) then commences.

Figure 4A:
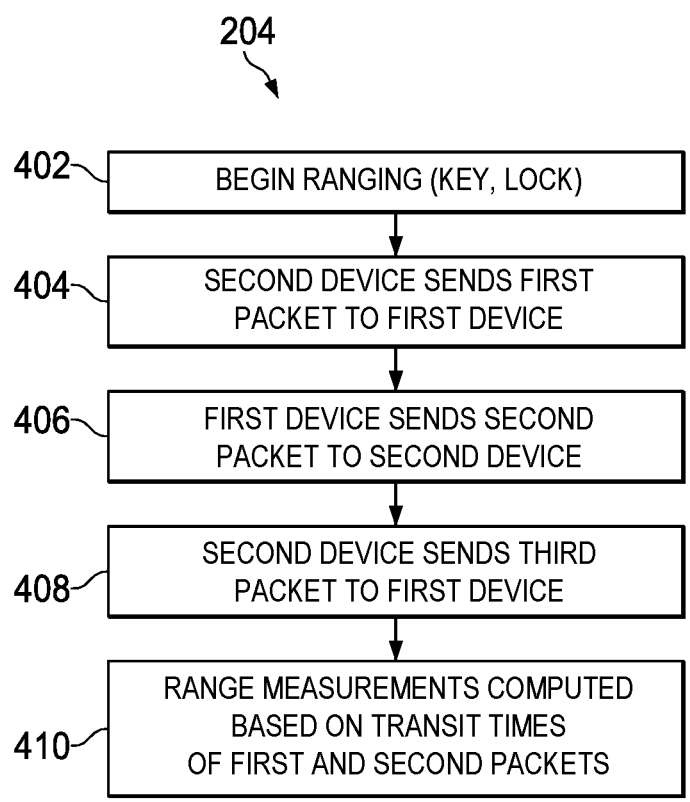
FIG. 4A is a flowchart of an exemplary ranging process performed between the first device and the second device.

FIG. 4A shows an exemplary ranging process (204) performed between the laptop 102 and the watch 104. Ranging is performed in order to obtain one or more range measurements (e.g., distance measurements) between the devices. Ranging initiates (402) from the laptop 102 (e.g., the client device) after the ranging keys are exchanged. During ranging, the laptop 102 and the watch 104 may transmit a series of wireless signals between each other. In this example, the watch 104 sends a first data packet to the laptop 102 (404). The first data packet may be encrypted according to a first encryption sequence of a plurality of encryption sequences. The laptop 102 then sends a second data packet to the watch 104 (406). The second data packet may be encrypted according to a second encryption sequence of the plurality of encryption sequences. The watch 104 then sends a third data packet to the laptop 102 (408). The third data packet may be encrypted according to a third encryption sequence of the plurality of encryption sequences.

One or more range measurements are computed (410) based on transit times (e.g., times-of-flight, or TOF) of the first and second data packets. In this example, the determinations of the TOF occur at the laptop 102, thus the time of transmission and time of arrival of the first data packet and the second data packet must be known by the laptop 102. As such, the time of transmission of the first data packet by the watch 104 and the time of arrival of the second data packet by the watch 104 are provided to the laptop 102. Such information is included in the third data packet.

In some implementations, the ranging process (204) may be performed inversely. For example, the first data packet may be sent by the laptop 102 (e.g., instead of the watch 104), the second data packet may be sent by the watch 104 (e.g., instead of the laptop 102), and the third data packet may be sent by the laptop 102. In such implementations, information related to the distance between the devices is conveyed to the device to be unlocked (e.g., the laptop 102).

Figure 4B:
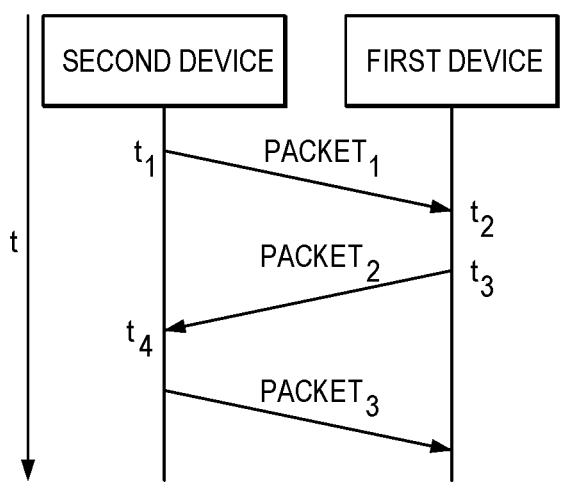
FIG. 4B illustrates a representation of a first, second, and third data packet transmitted between the first device and the second device.

FIG. 4B shows a graphical representation of the first, second, and third data packets transmitted between the laptop 102 and the watch 104. The first data packet, packet$_1$, is transmitted from the watch 104 at t=t$_1$ and received at the laptop 102 at t=t$_2$. The second data packet, packet$_2$, is transmitted from the laptop 102 at t=t$_3$ and received at the watch 104 at t=t$_4$. The third data packet, packet$_3$, is transmitted from the watch 104 to the laptop 102 and may include information related to one or both of the time of transmission of packet$_1$—t$_1$—and the time or arrival of packet$_2$—t$_4$. Information related to the time of transmission of packet$_3$ may be provided to the laptop 102 in subsequent transmissions, although it may not be necessary for computing the one or more range measurements.

In some examples, the range measurements may be computed by a wireless controller (e.g., a wireless card) of the laptop 102. For example, firmware in the wireless controller may be configured to compute the range measurements (e.g., in meters) based on the TOF of packet$_1$ and packet$_2$. In some examples, the range is computed from the product of the TOF and the speed of light c. The TOFs and range are given by Equations [1] and [2]:

$$\mathrm{TOF} = \tfrac{1}{2}((t_4 - t_1) - (t_3 - t_2)). \qquad [1]$$

$$\mathrm{Range} = c * \mathrm{TOF}. \qquad [2]$$

In some implementations, the laptop 102 and the watch 104 are configured to operate at different clock speeds and/or have different clock offsets, which could make the calculation of the TOF difficult. By employing the two-way ranging technique described herein using Equations [1] and [2], a common time base is not required because ($t_4-t_1$) and ($t_3-t_2$) can be measured independently at each device using its own local time base. That is, the two clocks need not be synchronized.

FIGS. 4A and 4B illustrate how a single range measurement between the laptop 102 and the watch 104 can be computed. The ranging process may be repeated any number of times in order to obtain a plurality of range measurements. The plurality of range measurements may be used to determine a range estimate (e.g., an estimate of the distance between the laptop 102 and the watch 104). In some implementations, ranging is repeatedly performed between the devices for a period of time of approximately 0.5 to 2 seconds. In some implementations, the ranging process may be extended and/or repeated if the unlock decision is ultimately determined to be negative. As is described in greater detail below, obtaining a larger number of range measurements typically ultimately results in improved accuracy of the determined unlock decision.

In a multipath environment, the TOF may be inaccurate due to multipath conditions in the wireless channel. That is, the transmitted signals may bounce off of one or more reflectors (e.g., walls) in the environment, thereby resulting in the wireless signals traveling a greater distance than would otherwise be traveled in the absence of reflectors. The greater distance traveled by the multipath signals requires a greater amount of time to traverse, which results in the times of arrival (e.g., $t_2$ and $t_4$) occurring later in time than the times of arrival for non-multipath signals. The inaccurate TOF of the multipath signals results in inaccurate range measurements. Range errors due to multipath can be compensated by filtering the range measurements (e.g., using a batch filter), as described in more detail below.

Figure 5:
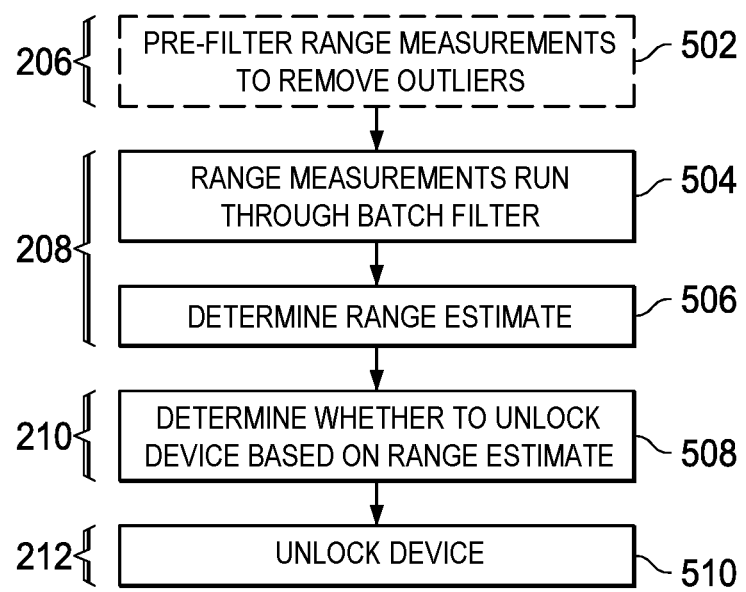
FIG. 5 is a flowchart of exemplary pre-filtering, batch filtering, and unlock decision processes performed at the first device.

FIG. 5 shows exemplary pre-filtering (206), batch filtering (208), and unlock decision (210) processes that are performed at the laptop 102. The computed range measurements may optionally be pre-filtered (502) (e.g., to remove outlier measurements). For example, the range measurements may be compared to one or more thresholds to determine whether each range measurement represents a reliable data point. Any range measurements that are discounted due to pre-filtering by deviating too far from expected results may be ignored in future processing. The range measurements (or, e.g., the remaining range measurements if pre-filtering is performed) are then run through a batch filter (504). In this example, the batch filter determines a range estimate (506) based on the filtering of the range measurements. A determination is then made as to whether to unlock the laptop 102 based on the determined range estimate (508). For example, the determination may be based at least in part on a comparison of the range estimate to a range threshold. If the range threshold is satisfied, the unlock decision may be positive. A positive unlock decision results in the laptop 102 being unlocked (510).

In some implementations, the range threshold is a predetermined distance value. In some examples, the range threshold may be in the order of meters (e.g., in the order of two to five meters). If the batch filtering results in a range estimate that is less than the range threshold, the laptop 102 may be unlocked. If the batch filtering results in a range estimate that is greater than the range threshold, the laptop 102 may remain locked and the unlock process (e.g., the unlock process 200 shown in FIG. 2) may revert to a previous stage, such as re-initiating discovery (202) or ranging (204).

In some implementations, the range threshold may be a dynamic distance value. The range threshold may change during the unlock process based on one or more factors. That is, the range threshold may have a default value (e.g., approximately two to three meters) that may be constrained or relaxed based on one or more of a variety of circumstances.

In some examples, the range threshold may change based on the types of one or both of the devices. In this example, the first device (e.g., the device to be unlocked, sometimes referred to as the "lock") is a laptop 102 and the second device (e.g., the device that causes the unlocking, sometimes referred to as the "key") is a watch 104. When the lock is a laptop 102, the default range threshold may be two meters. The particular range threshold may have a value that is based on an expected distance between the user and the type of the locked device when the user is attempting to access the locked device. For example, a user who is attempting to use a laptop 102 is typically relatively close to the laptop 102 during use (e.g., to allow the user to access the keyboard and trackpad). Thus, a range threshold of approximately two meters may be appropriate. However, if the locked device were instead a desktop computer, the range threshold may be relaxed. For example, a user who is attempting to use a desktop computer may be positioned relatively further away from the desktop computer during use (e.g., because the user interacts with peripheral devices such as the keyboard, mouse, and/or display that are positioned near the user but away from the wireless antenna), or the desktop computer may be positioned behind a reflector (e.g., such as the display) and therefore not be in line-of-sight with the key device. Thus, the range threshold may be increased to three or four meters when the locked device is a desktop computer.

In some implementations, the range threshold may change based on the type of the key device. The range threshold may have a value that is based on an expected distance between the key device and the locked device. For example, the watch 104 that is provided in the current example is typically expected to be worn on the user's wrist, and such can be confirmed (e.g., as part of device discovery). Thus, there is increased confidence that the position of the watch 104 is an accurate representation of the position of the user. However, if the key device were instead a mobile phone, there may be less confidence that the position of the phone corresponds to the position of the user. For example, mobile phones are sometimes kept away from the person (e.g., on a desk while at work, on the coffee table while at home, etc.). The range threshold may be adjusted to account for this additional uncertainty. In some examples, the range threshold may be relaxed to reduce false negative unlock decisions (e.g., an authorized user is close to the locked device but it is not unlocked because his or her phone is too far away). In some examples, the range threshold may be constrained to reduce false positive unlock decisions (e.g., an unauthorized user is able to unlock the locked device because an authorized user's phone was left near the locked device).

In some implementations, the range threshold may change based on characteristics of the particular environment and/or the effects of the particular environment on the wireless signals transmitted between the devices. For example, if the environment in which the laptop 102 and the watch 104 are positioned results in range measurements that include significant noise and/or the received signal strength indication (RSSI) of the wireless signals transmitted between the devices is relatively low, the range threshold may be relaxed (e.g., to reduce false negative unlock decisions) or constrained (e.g., to reduce false positive unlock decisions).

In some implementations, the range threshold may change based on a number of antennas and/or a type of antenna switching employed by the locked device and/or the key device. For example, if the number of antennas and the type of antenna switching that is employed typically results in measurements of increased accuracy (e.g., if multiple antennas are used), the range threshold may be relaxed (e.g., because there is increased confidence in the range estimation). In some implementations, the locked device may include two antennas. A quick check may be performed during the unlock process to determine which antenna is best suited to provide the most reliable data, and the ranging (204 of FIG. 2) can be performed by that antenna. In some implementations, information from multiple antennas of one of the devices can be considered during ranging (204).

In some implementations, instead of comparing the range estimate to a range threshold to arrive at an unlock decision, the range estimate may serve as one of a plurality of factors that are considered when determining whether to unlock the laptop 102. For example, the unlock decision may be based on a function that considers one or more of the range estimate, the device type of the locked device and/or the key device, a number of antennas in the locked device and/or the key device, a type of antenna switching employed by the locked device and/or the key device, a number of range measurements obtained during ranging, a measure of an amount of noise in the wireless signals transmitted between the devices during ranging, the RSSI of the wireless signals transmitted between the device during ranging, an accuracy or an expected accuracy of the range measurements, a signal-to-noise ratio of the wireless signals, a bandwidth of the wireless signals, and an integration time use to generate the range measurements, among others.

In some implementations, instead of or in addition to determining a range estimate (e.g., an estimate of the distance between the laptop 102 and the watch 104) as described with respect to FIG. 5, the batch filter may instead filter the range measurements as part of a hypothesis test to estimate a probability that the watch 104 is within the bubble 106. For example, the batch filter may determine a probability that the laptop 102 and the watch 104 are various distance apart (e.g., as a probability distribution). The probability distribution may then be used to determine a probability that the watch 104 is within the bubble 106, for example, by fitting the probability distribution to empirical data and determining a probability that the laptop 102 and the watch 104 are within a particular range of each other. Thus, the determination of whether to unlock the laptop 102 may not be based simply on a comparison of a range estimate between the laptop 102 and the watch 104 to a threshold, but rather by comparing the probability that the watch 104 is within sufficient range of the laptop 102 with another probability (e.g., a probability threshold), as describe in more detail below. In some implementations (e.g., if two distributions are used), the determination of whether to unlock the laptop 102 may be based on a comparison of the probability that the watch 104 is within sufficient range of the laptop 102 with a likelihood ratio threshold. For example, one distribution may be used when modeling either an inside bubble or an outside bubble probability distribution, and two distributions may be used when modeling both distributions in making the unlock decision.

As described above with respect to implementations in which the unlock decision is based at least in part on a comparison of a range estimate to a range threshold, the range threshold may be a dynamic distance value that may be constrained or relaxed based on a variety of factors surrounding the unlock decision. In this way, the bubble 106 may be characterized as a decision boundary that can be dynamically adjustable. Similarly, implementations that utilize a hypothesis test to determine whether the laptop 102 is to be unlocked can also be based at least in part on a dynamically adjustable decision boundary bubble 106.

In some implementations, to determine whether the laptop 102 is to be unlocked, the probability that the watch 104 is within sufficient range of the laptop 102 (e.g., within a predetermined range) can be compared to a dynamic probability threshold that changes based on one or more factors, such as a number of antennas and/or the type of antenna switching employed by the devices, among others. For example, suppose the unlock decision is based on a determination of whether the watch 104 is within two meters of the laptop 102. Under a first set of conditions (e.g., no antenna switching employed by the devices), the unlock decision may be positive if the hypothesis test indicates that there exists a 95% chance that the watch 104 is within two meters of the laptop 102. Under a second set of conditions (e.g., antenna switching employed by the laptop 102), the unlock decision may be positive if the hypothesis test indicates that there exists a 99% chance that the watch 104 is within two meters of the laptop 102 because the antenna switching may be expected to yield range measurements of improved accuracy. In this way, the boundary of the unlock decision can be relaxed (e.g., as illustrated under the first set of conditions) or constrained (e.g., as illustrated under the second set of conditions) as desired.

Whether the batch filtering (504 of FIG. 5) is used to determine a range estimate or to perform a hypothesis test based on the range measurements, the batch filter may be modeled according to a number of methodologies. Any of the following methodologies may be preceded by pre-filtering of the range measurements.

In some implementations, a maximum likelihood estimation (MLE) may be applied to the range measurements. The MLE may be related to a mean of the range measurements. For example, the MLE may consider a set of range measurements (e.g., and optionally one or more tuning parameters) and estimate the mode of the data given the particular underlying distribution that is being modeled. Averaging the range measurements may occur when the underlying distribution is Gaussian; in such a case, the mode is equal to the mean. In some implementations, the MLE may employ outlier rejection. For example, an estimate of an expected standard deviation may be obtained based on the modeling, and anything outside of a threshold (e.g., 3 or 4 sigma of the mean of the range measurements) may be discounted before the range estimate and/or the probability distribution is determined based on the average of the range measurements.

In some implementations, a count-based hypothesis test is employed to determine a count of range measurements that are within a range threshold and a count of range measurements that are outside of a range threshold. The range threshold may be a predetermined threshold distance or a dynamic threshold that changes based on one or more factors, as described above. The count-based hypothesis test may result in a positive unlock decision if the count of range measurements that are within the range threshold is greater than the number of range measurements that are outside of the range threshold.

In some implementations, a cluster-based test is employed. The range estimate and/or the probability distribution may be based on range measurement values that are closely clustered. For example, if a significant majority of the range measurements have values clustered between approximately 1.6 and 1.8 meters and the rest of the range measurements have unclustered values spread across various distances, the cluster-based test may determine that the range estimate is between 1.6 and 1.8 meters. Alternatively, such as in implementations in which a hypothesis test is performed, the cluster-based test may result in a determination of a probability that the devices are within 1.6 to 1.8 meters of each other and/or a determination of a probability that the devices are within a threshold range of each other (e.g., within the bubble).

In some implementations, a likelihood ratio (or, e.g., a log-likelihood ratio) test is employed. Such a test uses models for two possible cases of a distribution of ranges: one set of ranges that correspond to the device being unlocked, and one set of ranges that correspond to the device remaining locked. The likelihood ratio computes the ratio of the composite probabilities of being either inside or outside of the bubble based on the input set of ranges (e.g., the range measurements) and the modeled distributions. The ratio may then be compared to a threshold to determine the result of the unlock decision. In such implementations, the distance between the two devices may not be directly computed. As such, the threshold may not be presented in terms of meters.

Example Use Cases—Modeling the Filter

Various experimental use cases and related data are shown in FIGS. 6 through 8A-E to illustrate how the batch filter may be modeled to yield an accurate unlock decision involving the laptop 102 (e.g., a MacBook®) and the watch 104 (e.g., an Apple Watch®). Such experimentation may be performed to determine types of filtering methodologies that can be employed in actual implementations (e.g., implementations in which the true distance between the devices is unknown and thus it is unknown whether the laptop 102 should unlock or remain locked) for minimizing false positive and false negative unlock decisions.

Range measurement data for 22 use cases were collected and examined. Each of the 22 use cases was examined with the laptop 102 resting on a metal table and a wooden table, resulting in a total of 44 cases. The watch 104 was positioned at various locations relative to the laptop 102. All of the use cases represent various positions and situations in which a user wearing the watch 104 may be in or around the environment in which the laptop 102 resides. Some of the use cases are referred to as "positive use cases" which are expected to result in a positive unlock decision (e.g., use cases in which the user is close to the laptop 102 and/or intends to access the laptop 102); some of the use cases are referred to as "negative use cases" which are expected to result in a negative unlock decision (e.g., use cases in which the user is far away from the laptop 102 and/or does not intend to access the laptop 102). The use cases included a mix of likely use cases and challenging use cases (e.g., use cases in which a correct unlock decision may be difficult to determine).

Figure 6:
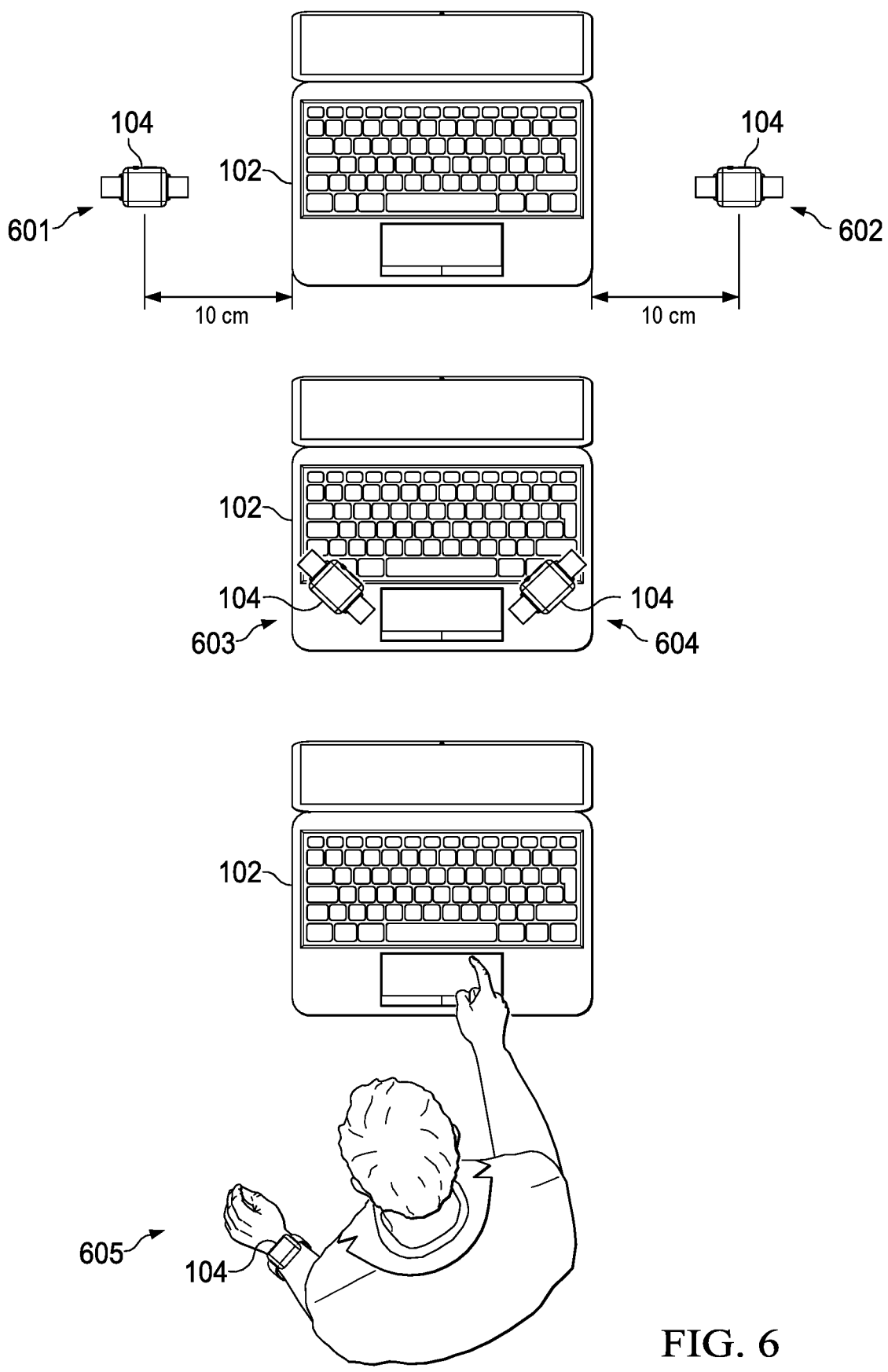
FIG. 6 illustrates examples of a subset of experimental use cases of the first device and the second device that were examined to model a batch filter.
Figure 7:
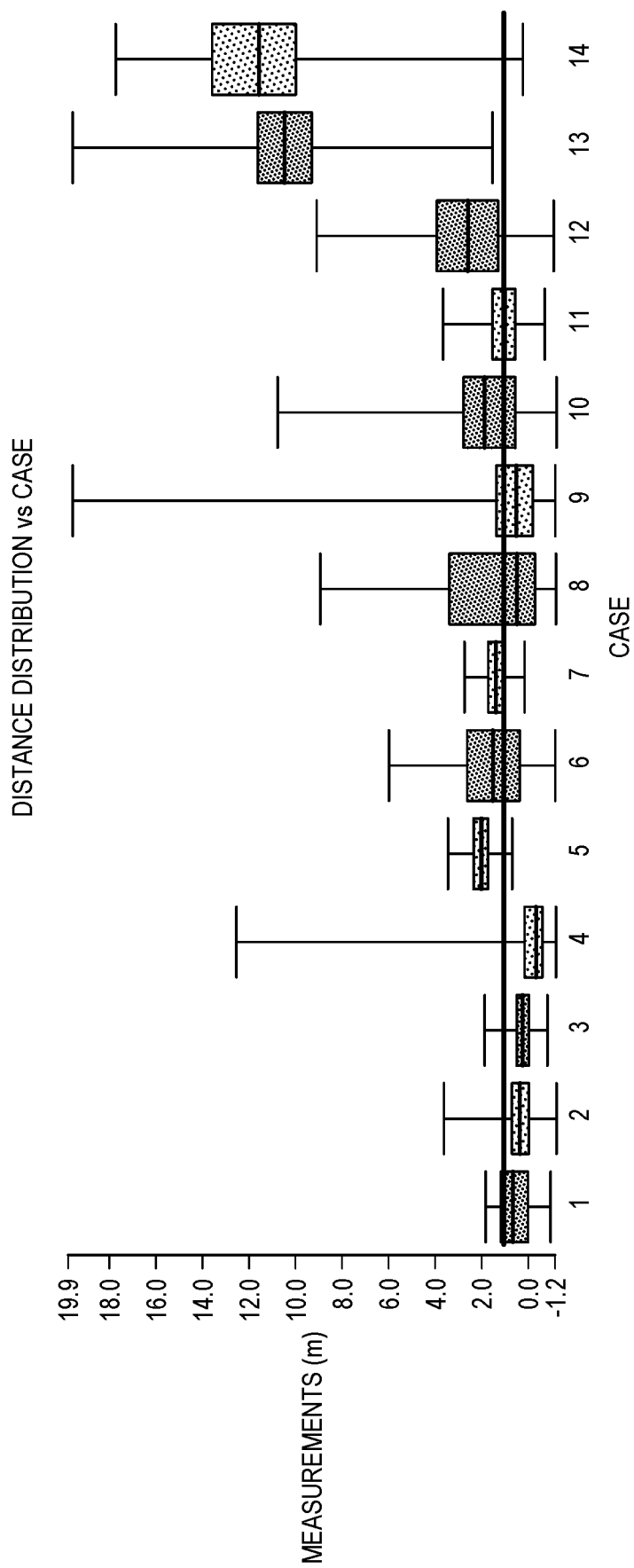
FIG. 7 shows range measurement data that corresponds to a subset of the experimental use cases.

FIG. 6 illustrates an example of five of the use cases that were examined on the wooden table. In use case #1 (601), the watch 104 was positioned 10 cm to the left of the laptop 102; in use case #2 (602), the watch 104 was positioned 10 cm to the right of the laptop 102; in use case #3 (603), the watch 104 was positioned on the front-left corner of the laptop 102; in use case #4 (604), the watch 104 was positioned on the front-right corner of the laptop 102; in use case #5 (605), the watch 104 was positioned some distance in front of the laptop. The other use cases are not shown. Each of the five illustrated use cases represent positive use cases in which the laptop should unlock. That is, the five illustrated use cases represent positions of a user who intends to access the laptop 102 and for which a positive unlock decision should result.

Range measurement data was collected for each of the use cases (e.g., according to the process described above with respect to FIGS. 4A and 4B). In this implementation, approximately 500 range measurements were collected per use case per table type. In an actual implementation, the number of range measurements obtained may be in the order of approximately 1-10, although any number is possible. The range measurement data that corresponds to 14 of the 22 use cases on the wooden table are shown as a box plot representation (e.g., a box-and-whisker representation) in FIG. 7. The top and bottom "whiskers" represent the largest and smallest range measurements, respectively, for each use case; the top and bottom of the "box" represents the $75^{th}$ and $25^{th}$ percentile of the range measurements, respectively, for each use case; the bold line within each box represents the "true distance" (e.g., the actual distance between the watch 104 and the laptop 102, or more specifically, the actual distance between the wireless antenna(s) of the watch 104 and the wireless antenna(s) of the laptop 102).

Use cases # 1-12 may represent positive use cases, and use cases # 13 and 14 may represent negative use cases. Referring briefly to FIG. 6, use cases # 1-4 show situations in which the watch 104 is very close to the laptop 102. Under such conditions, the laptop 102 should give a positive unlock decision. Use case #5 also shows a situation in which the watch 104 is relatively close to the laptop 102, and should also result in a positive unlock decision. Now referring again to FIG. 7, as expected, the data that corresponds to use cases # 1-4 show range measurements that are very close to 0 meters (e.g., the watch 104 is very close to the laptop 102), while the data that corresponds to use case # 5 show range measurements that are still relatively small, but closer to approximately 2 meters. Regardless, all five of the illustrated use cases are expected to yield a positive unlock decision.

In contrast, the data that corresponds to negative use cases # 13 and 14 show range measurements that are approximately 10-14 meters (e.g., the watch 104 is relatively far away from the laptop 102). Although use cases # 13 and 14 are not specifically illustrated like use cases # 1-5 are, they may correspond to situations in which the laptop 102 is in the office of a home of the user, and the user wearing the watch 104 is in a different room. Under such circumstances, the user likely does not intend to access the laptop 102, and thus the unlock decision should be negative (assuming the discovery procedure described above is even possible).

Figure 8A:
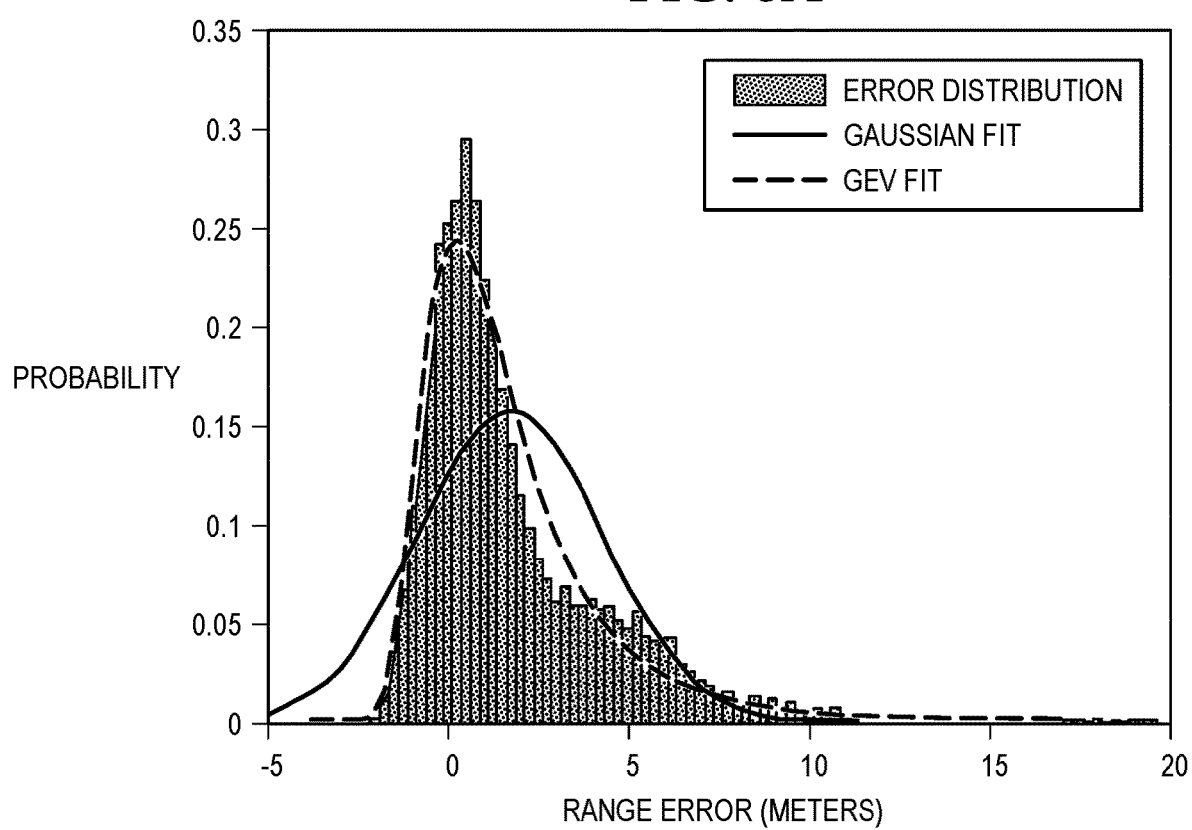
FIG. 8A illustrates a distribution of the range measurements for positive use cases of the experimental use cases.

FIG. 8A illustrates the distribution of the range measurements for the positive use cases. The distribution is plotted as a representation of the range errors of the measurements relative to the probability that each range error will result. For example, because each of the use cases involved a different true distance between the watch 104 and the laptop 102, the data was normalized. The probabilities listed on the y-axis correspond to the number of occurrences of each range error across the positive use cases.

As described above, many environments may include reflectors that result in transmitted wireless signals traversing a non-direct path between the laptop 102 and the watch 104. Such wireless signals are referred to herein as multipath signals, and are the cause of the extended tail to the right of the range distribution shown in FIG. 8A. Range errors can be compensated by filtering the measurements through a batch filter that is modeled according to one or more of the methodologies described above (e.g., MLE with or without outlier rejection, count-based, cluster-based, likelihood ratio, etc.). In fact, the purpose of the experimentation described with respect to FIGS. 6 through 8A-E is to identify filtering methodologies that yield the most accurate unlock decisions (e.g., unlock decisions that minimize false positive and false negative rates) when the true distance is known for use in actual implementations in which the true distance is not known.

The data shown in FIG. 8A identify the probability of where a single range measurement will fall in the distribution. For example, if the single range measurement involves non-multipath signals (e.g., the wireless signals used to compute the TOF are transmitted directly between the devices), the range may be at or close to 0 meters. In contrast, if the single range measurement involves multipath signals (e.g., the wireless signals used to compute the TOF bounce off one or more reflectors before reaching the destination device), the range may be at or close to the tail of the distribution. In an actual implementation, more than one range measurement is typically obtained. The multiple range measurements can be processed to obtain a better estimation of the true range (or, e.g., to determine to a higher certainty that the range measurements are closer to the true range).

The data distribution was fit according to various filtering methodologies to reduce range errors due to measurement noise and multipath. The solid curve represents a Gaussian distribution that provides a reasonable fit; however, the Gaussian distribution does a relatively poor job of accounting for the tail to the right of the distribution. A more-complex generalized extreme value (GEV) distribution represented by the dotted curve provides a much better fit for the data. While only two possible filtering methodologies are shown in FIG. 8A, many others were tested, such as log-normal, Rician, and the like.

In order to more accurately replicate conditions that would exist in an actual implementation (e.g., in which multiple range measurements are obtained), the GEV model was adjusted to assume that five range measurements were obtained. FIG. 8B illustrates the adjusted GEV model for the positive use cases 802 when five range measurements are obtained. A corresponding adjusted GEV model for the negative use cases 804 was also generated. In this example, both the positive and negative distributions were part of the likelihood test. In some implementations (e.g., when an MLE-type estimator is used for the likelihood test), only one of the positive distribution or the negative distribution may be needed.

In this example, a range threshold (e.g., a bubble size) of three meters was established, as indicated by the dotted line overlaid on the plot. Because the true distance of the positive use cases is 0 meters and the true distance of the negative use cases (e.g., simulated) is seven meters, ideally every positive use case would result in a positive unlock decision and every negative use case would result in a negative unlock decision. However, due to the various errors described above, this is not the case in practice. Rather, the area under the GEV model for the positive use cases 802 and to the left of the dotted line represents the positive success rate (e.g., the probability that the laptop 102 and the watch 104 are close together and the unlock decision is positive); the area under the GEV model for the positive use cases 802 and to the right of the dotted line represents the positive failure rate (e.g., the probability that the laptop 102 and the watch 104 are close together but the unlock decision is negative); the area under the GEV model for the negative use cases 804 and to the right of the dotted line represents the negative success rate (e.g., the probability that the laptop 102 and the watch 104 are far apart and the unlock decision is negative); and the area under the GEV model for the negative use cases 804 and to the left of the dotted line represents the negative failure rate (e.g., the probability that the laptop 102 and the watch 104 are far apart but the unlock decision is positive). The negative failure rate is illustrated as residing within the circled region. Under the stated assumptions, the positive success rate is approximately 96.1% and the negative failure rate is much less than 0.01%.

To reiterate, in an actual implementation, the data obtained from the devices is not separated into positive use cases and negative use cases, and of course, the true distance is not known. As a brief aside, in an actual implementation, after the distribution of the range measurement data is filtered, a range threshold may be applied. The probability that the distance between the devices is within the range threshold may be determined. The outcome of the unlock decision may depend at least in part on a comparison between the probability that the distance between the devices is within the range threshold and a probability threshold. For example, the unlock decision may be positive if, according to the filtered range measurement data, there is a 95% chance or higher that the distance between the devices is less than the range threshold. In some implementations, a range estimate between the devices may be determined based at least in part on the filtered range measurement data, and the unlock decision may be based at least in part on a comparison between the range estimate and the range threshold. Similarly, in some implementations, the outcome of the unlock decision may be based at least in part on a degree of conformity of the range measurements to one or more models (e.g., distributions) of range data.

While a GEV model was described and illustrated in FIGS. 8A and 8B, other filtering methodologies (e.g., estimators) may alternatively be used. Each of the filtering methodologies may include one or more tuning parameters. Values for one or more of the tuning parameters may be established based on the collected data. For example, the GEV model shown in FIGS. 8A and 8B has three tuning parameters—mean, sigma, and shape factor. The shape factor may be set based on the collected data, and the mean and sigma may be determined as a function of the actual measurements.

Figure 8C:
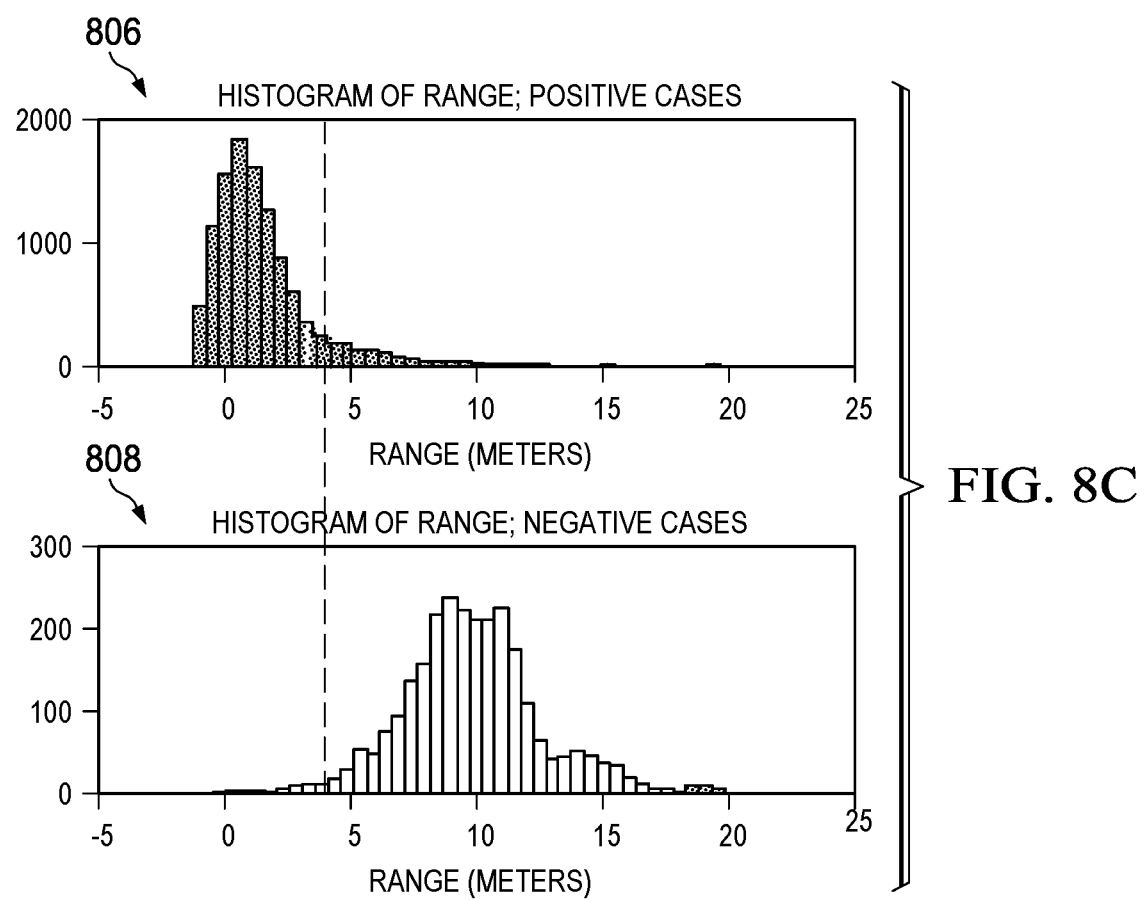
FIG. 8C illustrates another representation of the distribution of range measurements for the experimental use cases.
Figure 8E:
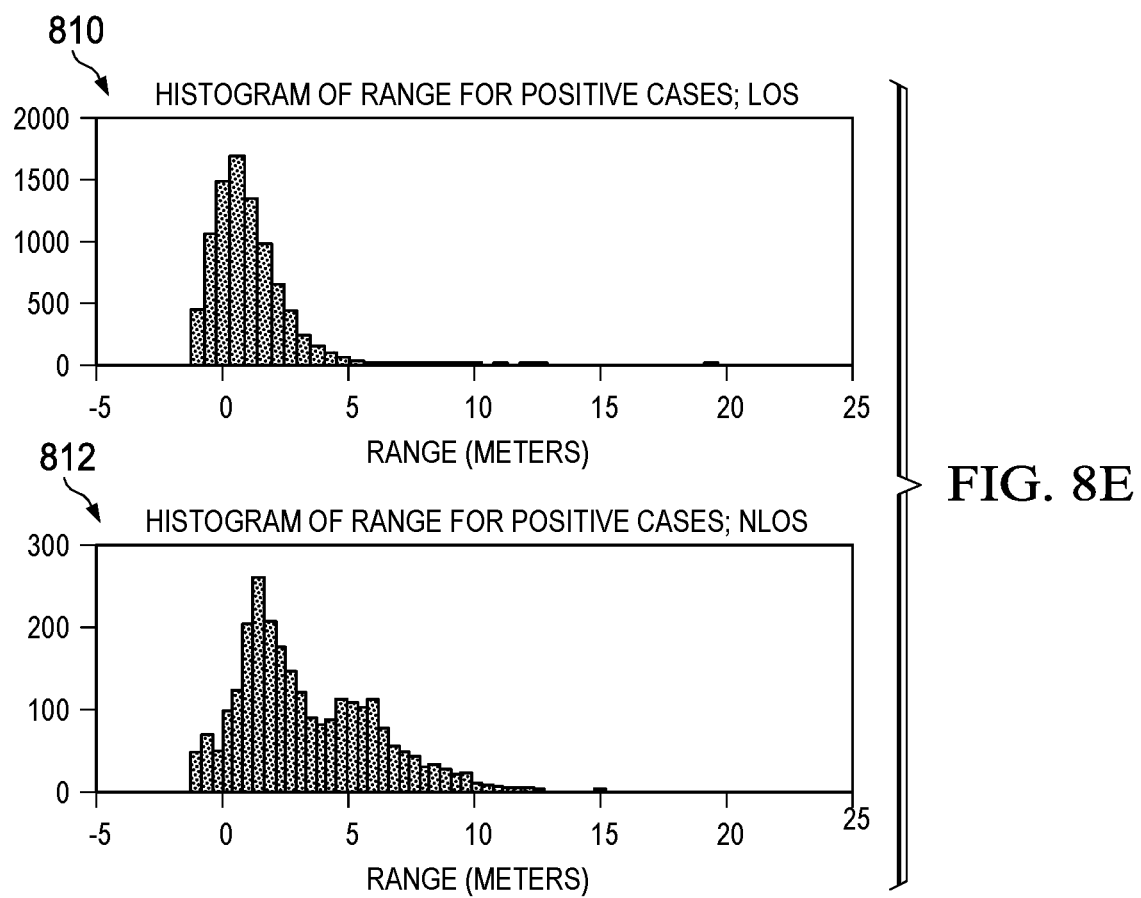
FIG. 8E illustrates a distribution of range measurements for positive line-of-sight (LOS) use cases and positive non-line-of-sight (NLOS) use cases of the experimental use cases.

FIG. 8C shows another representation of the distribution of range measurements for the 22 use cases. The representation includes both a plot of range measurements for the positive use cases 806 and a plot of range measurements for the negative use cases 808. In this representation, the plots 806, 808 show the actual range measurements relative to the total number of measurements.

In this example, a range threshold (e.g., a bubble size) of four meters was established, as indicated by the dotted line overlaid on the plot. In a manner similar to that described above with respect to FIG. 8B, the positive success rate, the positive failure rate, the negative success rate, and the negative failure rate can be determined by examining the area that resides underneath each curve and to the left or right of the range threshold.

FIG. 8D shows a table that indicates the positive success rates and the negative failure rates depending on the particular range threshold employed and the number of range measurements obtained. The positive success rates (e.g., the probability that the laptop 102 and the watch 104 are close together and the unlock decision is positive) and the negative failure rates (e.g., the probability that the laptop 102 and the watch 104 are far apart but the unlock decision is positive) both increase as the range threshold increases. For example, briefly referring again to FIG. 8C, as the range threshold increases (e.g., moves to the right), the area under the positive use case plot 806 to the left of the threshold increases and the area under the negative use case plot 808 to the left of the threshold also increases. This exemplifies a natural tradeoff between usability and security. In other words, a system that is designed with the goal of minimizing false negatives (e.g., minimizing situations in which the laptop 102 does not unlock but it should have) is naturally going to allow more false positives (e.g., situations in which the laptop 102 unlocks but it should not have). The system may be designed such that the occurrences of false positives and false negatives are balanced as desired.

The table also illustrates that the positive success rate is maximized and the negative failure rate is minimized when additional range measurements are obtained. This is because the filtering methodology employed is more effective when a greater number of measurement points are available. Thus, it may be desirable to obtain a relatively large number of range measurements (e.g., more than 5, more than 10, more than 20, etc.) between the laptop 102 and the watch 104.

Of the 22 use cases, some are characterized as line-of-sight (LOS) and some are characterized as non-line-of-sight (NLOS). The data discussed with respect to FIGS. 8C and 8D includes both LOS and NLOS positive use cases. However, the LOS and NLOS use cases are plotted separately in FIG. 8E, which shows a representation of the distribution of range measurements that includes a plot of the positive LOS use cases 810 and a plot of the positive NLOS use cases 812. The LOS use cases involved the laptop 102 and the watch 104 being in direct LOS of each other (e.g., without walls or other barriers being positioned therebetween), and the NLOS use cases involved one or more physical impedances between the laptop 102 and the watch 104. A comparison of the LOS plot 810 and the NLOS plot 812 shows that the LOS use cases achieve a tighter distribution than the NLOS use cases, illustrating the difficulties inherent in obtaining accurate range measurements in NLOS environments. However, with proper filter modeling, even the NLOS implementations can be refined to provide range measurements that are accurate enough to arrive at a satisfactory success rate for the unlock decision, as shown by the relatively high positive success rates and relatively low negative failure rates shown in FIG. 8D. When the NLOS use cases were discounted from the data, the positive success rates increased significantly.

Figure 9B:
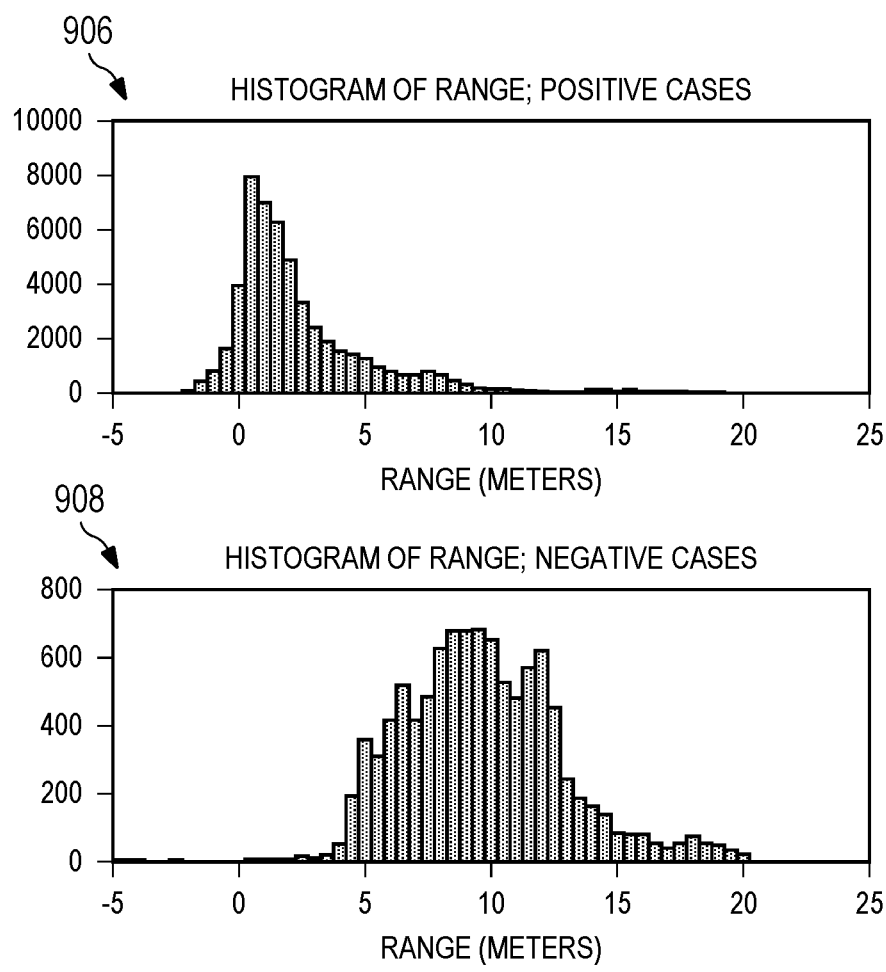
FIG. 9B illustrates another representation of the distribution of the range measurements for the various experimental use cases.

Information related to additional use cases is shown in FIGS. 9A-C to illustrate how the batch filter may be modeled to yield an accurate unlock decision. In these examples, range measurement data for 30 use cases were collected and examined. Each of the 30 use cases was performed in various different environments (e.g., home environments, work environments, outdoor environments, etc.). Various different types of devices for the first device (e.g., the device to be unlocked) and the second device (e.g., the device that causes the unlocking) were used. For example, a Mac Pro®, an iMac®, a Mac Mini®, a MacBook®, and a MacBook Pro® were used for the first device, and at least an Apple Watch® was used for the second device. The 30 use cases included configurations similar to those illustrated in FIG. 6 and included both positive use cases and negative use cases.

Range measurement data was collected for each of the use cases (e.g., according to the process described above with respect to FIGS. 4A and 4B). The distribution of collected data was fit according to various filtering methodologies (e.g., including a GEV methodology) to reduce range errors due to measurement noise and multipath. In order to more accurately replicate condition that would exist in an actual implementation (e.g., in which multiple range measurements are obtained), the GEV model was adjusted to assume that five range measurements were obtained. FIG. 9A illustrates the adjusted GEV model for the positive use cases 902 when five range measurements are obtained. A corresponding adjusted GEV model for the negative use cases 904 was also generated. In this example, both the positive and negative distributions were part of the likelihood test, although in some implementations, only one of these distributions may be needed.

In this example, a range threshold (e.g., a bubble size) of three meters was established, as indicated by the dotted line overlaid on the plot. Because the true distance of the positive use cases is 0 meters and the true distance of the negative use cases (e.g., simulated) is five meters, ideally every positive use case would result in a positive unlock decision and every negative use case would result in a negative unlock decision. However, due to the various errors described above, this is not the case in practice. Rather, the area under the GEV model for the positive use cases 902 and to the left of the dotted line represents the positive success rate (e.g., the probability that the first device and the second device are close together and the unlock decision is positive); the area under the GEV model for the positive use cases 902 and to the right of the dotted line represents the positive failure rate (e.g., the probability that the first device and the second device are close together but the unlock decision is negative); the area under the GEV model for the negative use cases 904 and to the right of the dotted line represents the negative success rate (e.g., the probability that the first device and the second device are far apart and the unlock decision is negative); and the area under the GEV model for the negative use cases 904 and to the left of the dotted line represents the negative failure rate (e.g., the probability that the first device and the second device are far apart but the unlock decision is positive).

FIG. 9B shows another representation of the distribution of range measurements for the 30 use cases. The representation includes both a plot of range measurements for the positive use cases 906 and a plot of range measurements for the negative use cases 908. In this representation, the plots 906, 908 show the actual range measurements relative to the total number of measurements.

In this example, a range threshold (e.g., a bubble size) of four meters was established. In a manner similar to that described above with respect to FIG. 9A, the positive success rate, the positive failure rate, the negative success rate, and the negative failure rate can be determined by examining the area that resides underneath each curve and to the left or right of the range threshold.

FIG. 9C shows a table that indicates the positive success rates and the negative failure rates depending on the particular range threshold employed and the number of range measurements obtained. The positive success rates (e.g., the probability that the first device and the second device are close together and the unlock decision is positive) and the negative failure rates (e.g., the probability that the first device and the second device are far apart but the unlock decision is positive) both increase as the range threshold increases. For example, briefly referring again to FIG. 9B, as the range threshold increases (e.g., moves to the right), the area under the positive use case plot 906 to the left of the threshold increases and the area under the negative use case plot 908 to the left of the threshold also increases. This exemplifies a natural tradeoff between usability and security. In other words, a system that is designed with the goal of minimizing false negatives (e.g., minimizing situations in which the first device does not unlock but it should have) is naturally going to allow more false positives (e.g., situations in which the first device unlocks but it should not have). The system may be designed such that the occurrences of false positives and false negatives are balanced as desired.

The table also illustrates that the positive success rate is maximized and the negative failure rate is minimized when additional range measurements are obtained. This is because the filtering methodology employed is more effective when a greater number of measurement points are available. Thus, it may be desirable to obtain a relatively large number of range measurements (e.g., more than 5, more than 10, more than 20, etc.) between the first device and the second device.

While the unlock process has largely been described in relation to the laptop 102 and the watch 104 of FIG. 1 (e.g., in particular, a MacBook® and an Apple Watch®), other devices may be used for the first device (e.g., the device to be unlocked, sometimes referred to as the "lock") and the second device (e.g., the device that causes the unlocking, sometimes referred to as the "key"). In some implementations, the first device may be an iMac®, a Mac Pro®, a Mac Mini®, or a MacBook Pro®. In some implementations, the second device may be an iPhone®. In some implementations, both the first device and the second device are computing devices including but not limited to desktop computers, laptop computers, mobile computing devices, smart phones, etc.

In some implementations, the device to be unlocked is an automobile and the device that causes the unlocking is a wearable device such as the watch 104. A bubble is defined around the automobile. Techniques similar to those described above with respect to FIGS. 2-5 may be employed to determine whether the watch 104 is within the bubble. If the watch 104 is determined to be within the bubble, the automobile is configured to make a positive unlock decision which may unlock the automobile (or, e.g., put the automobile in an unlockable state). In some implementations, the automobile may be unlocked upon user interaction, such as by a key press on a surface of the automobile or by the user pulling a door handle. If the watch 104 is determined to be outside of the bubble, the automobile may remain locked.

While the bubble (106 of FIG. 1) described with respect to the laptop 102 has been described as corresponding to a range in the order of a few meters in some implementations, the bubble surrounding the automobile may correspond to different ranges. That is, the bubble may be such that the decision to unlock the automobile may be relatively more relaxed or relatively more constrained. In some implementations, because of the negative consequences that could result from a false positive unlock decision for the automobile, the bubble may correspond to a threshold range of only approximately one meter. However, in some implementations, because a user who wants to unlock an automobile typically expects to be able to do so from approximately 20-30 meters away (e.g., by using a key fob), the bubble may correspond to a similar threshold range. Ultimately, the bubble can be designed such that occurrences of false positives and false negatives are minimized and balanced as desired.

The systems and techniques described herein provide significant advantages over existing methods of unlocking (e.g., unlocking electronic devices, automobiles, door locks, etc.). Traditionally, unlocking of a lock requires some form of user interaction. In the most traditional sense, a user who is authorized to access the contents behind a lock possesses a key. The user inserts the key into the lock, turns the key, and the door opens. Locks are also essential in the realm of electronic devices, which typically contain sensitive information. In such cases, the "key" is typically in the form of a code, password, or passcode. Such a password may be a series of numbers or letters that are known only to the persons who are authorized to access the electronic device. To unlock the device, the user types the code into the device through a user interface, and access is then granted. Such methods of unlocking a physical lock or an electronic device require time and can be cumbersome to the user.

Advances have been made to simplify unlocking. In some implementations, a user who possesses a wireless key (e.g., a device that has wireless communication capabilities) may be able to unlock a corresponding device. For example, a door lock may be paired to a key fob and both may be configured to wirelessly communicate with each other. When the key fob is within some particular distance of the lock, the lock may unlock. However, such unlocking techniques have a number of drawbacks. Firstly, wireless communication is not always reliable so as to yield an accurate representation of the distance between the key fob and the lock. In other words, the key fob and the lock may be within sufficient range of each other such that the lock should unlock, but due to wireless communication shortcomings the lock may nonetheless remain locked. Conversely, the key fob and the lock may be outside of the predetermined range that permits unlocking, but the lock may nevertheless unlock. One reason for such inaccuracies in wireless communication is the presence of multipath wireless signals (e.g., wireless signals that bounce off reflectors before they reach their destination). Other environmental factors may also play a role in such inaccuracies.

The systems and techniques described herein address such shortcomings by providing an unlock bubble that represents a lock/unlock decision boundary. The decision boundary may correspond to a range (e.g., distance) between the locked device and the "key" device. The range may be adjustable based on a number of factors. For example, if the devices determine that the wireless signals transmitted between the devices are reliable, the unlock bubble may be constrained due to the expected high accuracy of the range measurements. Similarly, environmental conditions, the types of the devices, the antenna switching methodologies employed, and/or the level of security desired may call for the bubble to be adjusted as needed. Rather than simply estimating a distance between the devices based on transmitted wireless signals, the systems and techniques described herein perform a number of pre-filtering, filter modeling, and batch filtering processes to ensure that the determined distance between the devices is as accurate as possible and that the unlock decision is appropriate given the particular circumstances and the primary motivations surrounding such. Existing computing devices that employ unlocking techniques are not known to provide for such adaptability to maximize unlock decision accuracy.

Figure 10:
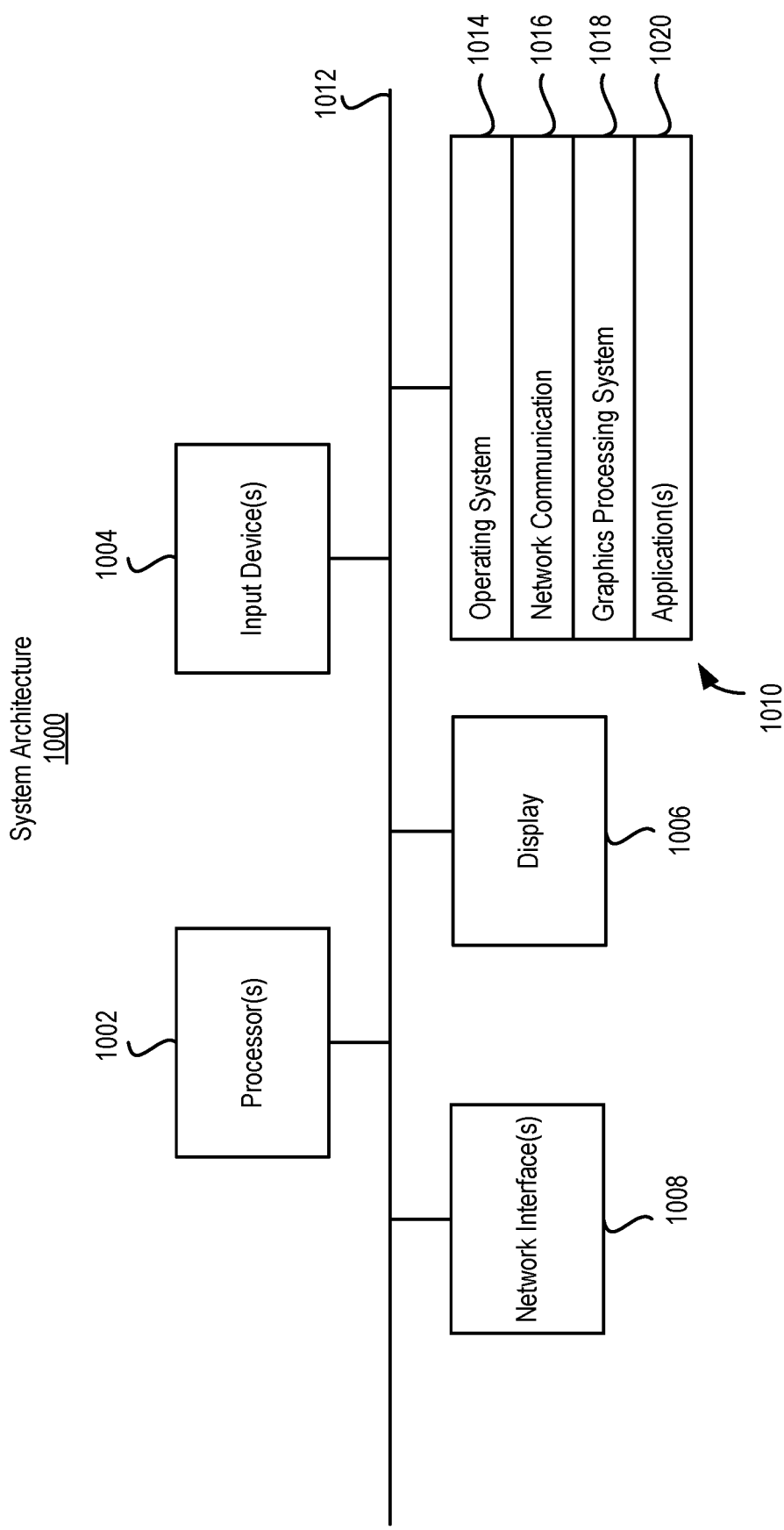
FIG. 10 is a block diagram of an exemplary system architecture implementing the features and processes of FIGS. 1-9.

FIG. 10 is a block diagram of an exemplary system architecture implementing the features and processes of FIGS. 1-9. The architecture 1000 can be implemented on any electronic device that runs software applications derived from compiled instructions, including without limitation personal computers (e.g., the laptop 102 shown in FIG. 1), servers, smart phones, media players, electronic tablets, game consoles, email devices, wearable devices (e.g., the watch 104 shown in FIG. 1), etc. In some implementations, the architecture 1000 can include one or more processors 1002, one or more input devices 1004, one or more display devices 1006, one or more network interfaces 1008 and one or more computer-readable media 1010. Each of these components can be coupled by bus 1012.

Display device 1006 can be any known display technology, including but not limited to display devices using Liquid Crystal Display (LCD) or Light Emitting Diode (LED) technology. Processor(s) 1002 can use any known processor technology, including but are not limited to graphics processors and multi-core processors.

Input device 1004 can be any known input device technology, including but not limited to a keyboard (including a virtual keyboard), mouse, track ball, and touch-sensitive pad or display. In some implementations, the input device 1004 could include a microphone that facilitates voice-enabled functions, such as speech-to-text, speaker recognition, voice replication, digital recording, and telephony functions. The input device 1004 can be configured to facilitate processing voice commands, voiceprinting and voice authentication. In some implementations, audio recorded by the input device 1004 is transmitted to an external resource for processing. For example, voice commands recorded by the input device 1004 may be transmitted to a network resource such as a network server which performs voice recognition on the voice commands.

Bus 1012 can be any known internal or external bus technology, including but not limited to ISA, EISA, PCI, PCI Express, NuBus, USB, Serial ATA or FireWire.

Computer-readable medium 1010 can be any medium that participates in providing instructions to processor(s) 1002 for execution, including without limitation, non-volatile storage media (e.g., optical disks, magnetic disks, flash drives, etc.) or volatile media (e.g., SDRAM, ROM, etc.).

Computer-readable medium 1010 can include various instructions 1014 for implementing an operating system (e.g., Mac OS®, Windows®, Linux). The operating system can be multi-user, multiprocessing, multitasking, multi-threading, real-time and the like. The operating system performs basic tasks, including but not limited to: recognizing input from input device 1004; sending output to display device 1006; keeping track of files and directories on computer-readable medium 1010; controlling peripheral devices (e.g., disk drives, printers, etc.) which can be controlled directly or through an I/O controller; and managing traffic on bus 1012. Network communications instructions 1016 can establish and maintain network connections (e.g., software for implementing communication protocols, such as TCP/IP, HTTP, Ethernet, etc.).

A graphics processing system 1018 can include instructions that provide graphics and image processing capabilities. For example, the graphics processing system 1018 can implement the processes described with reference to FIGS. 1-9.

Application(s) 1020 can be an application that uses or implements the processes described in reference to FIGS. 1-9. The processes can also be implemented in operating system 1014.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Figure 11:
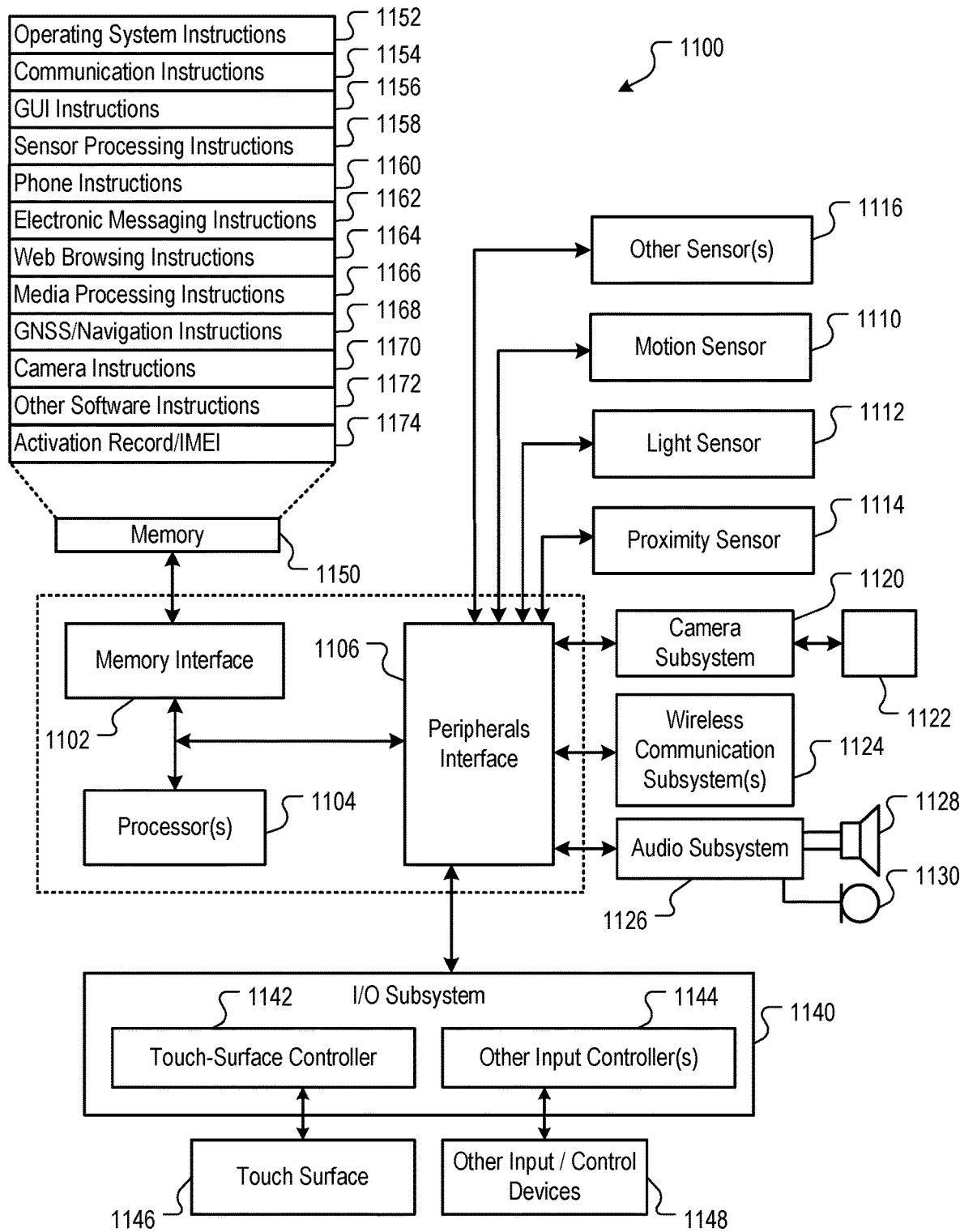
FIG. 11 is a block diagram of an exemplary computing device that can implement the features and processes of FIGS. 1-9.

FIG. 11 is a block diagram of an example computing device 1100 that can implement the features and processes of FIGS. 1-9. The computing device 1100 can include a memory interface 1102, one or more data processors, image processors and/or central processing units 1104, and a peripherals interface 1106. The memory interface 1102, the one or more processors 1104 and/or the peripherals interface 1106 can be separate components or can be integrated in one or more integrated circuits. The various components in the computing device 1100 can be coupled by one or more communication buses or signal lines. In some implementations, the computing device 1100 is the watch 104 (e.g., the Apple Watch®) shown in FIG. 1.

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions. Other sensors 1116 can also be connected to the peripherals interface 1106, such as a global navigation satellite system (GNSS) (e.g., GPS receiver), a temperature sensor, a biometric sensor, or other sensing device, to facilitate related functionalities.

A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips. The camera subsystem 1120 and the optical sensor 1122 can be used to collect images of a user to be used during authentication of a user, e.g., by performing facial recognition analysis.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which the computing device 1100 is intended to operate. For example, the computing device 1100 can include communication subsystems 1124 designed to operate over a GSM network, a GPRS network, an EDGE network, a Wi-Fi or WiMax network, and a Bluetooth™ network. In particular, the wireless communication subsystems 1124 can include hosting protocols such that a device (e.g., the laptop 102 shown in FIG. 1, a mobile device, etc.) can be configured as a base station for other wireless devices.

An audio subsystem 1126 can be coupled to a speaker 1128 and a microphone 1130 to facilitate voice-enabled functions, such as speaker recognition, voice replication, digital recording, and telephony functions. The audio subsystem 1126 can be configured to facilitate processing voice commands, voiceprinting and voice authentication, as described above with reference to FIGS. 1-9. In some implementations, the microphone 1130 facilitates voice-enabled functions, such as speech-to-text, speaker recognition, voice replication, digital recording, and telephony functions. The audio subsystem 1126 can be configured to facilitate processing voice commands, voiceprinting and voice authentication. In some implementations, audio recorded by the audio subsystem 1126 is transmitted to an external resource for processing. For example, voice commands recorded by the audio subsystem 1126 may be transmitted to a network resource such as a network server which performs voice recognition on the voice commands.

The I/O subsystem 1140 can include a touch-surface controller 1142 and/or other input controller(s) 1144. The touch-surface controller 1142 can be coupled to a touch surface 1146. The touch surface 1146 and touch-surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In one implementation, a pressing of the button for a first duration can disengage a lock of the touch surface 1146; and a pressing of the button for a second duration that is longer than the first duration can turn power to the computing device 1100 on or off. Pressing the button for a third duration can activate a voice control, or voice command, module that enables the user to speak commands into the microphone 1130 to cause the device to execute the spoken command. The user can customize a functionality of one or more of the buttons. The touch surface 1146 can, for example, also be used to implement virtual or soft buttons and/or a keyboard.

In some implementations, the computing device 1100 can present recorded audio and/or video files, such as MP3, AAC, and MPEG files. In some implementations, the computing device 1100 can include the functionality of an MP3 player, such as an iPod®. The computing device 1100 can, therefore, include a 36-pin connector that is compatible with the iPod®. Other input/output and control devices can also be used.

The memory interface 1102 can be coupled to memory 1150. The memory 1150 can include high-speed random access memory and/or non-volatile memory, such as one or more magnetic disk storage devices, one or more optical storage devices, and/or flash memory (e.g., NAND, NOR). The memory 1150 can store an operating system 1152, such as Darwin, RTXC, LINUX, UNIX, OS X, WINDOWS, or an embedded operating system such as VxWorks.

The operating system 1152 can include instructions for handling basic system services and for performing hardware dependent tasks. In some implementations, the operating system 1152 can be a kernel (e.g., UNIX kernel). In some implementations, the operating system 1152 can include instructions for performing voice authentication. For example, operating system 1152 can implement the security lockout and voice authentication features as described with reference to FIGS. 1-9. Operating system 1152 can implement the voiceprint and voice authentication features described with reference to FIGS. 1-9.

The memory 1150 can also store communication instructions 1154 to facilitate communicating with one or more additional devices, one or more computers and/or one or more servers. The memory 1150 can include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and functions; and/or camera instructions 1170 to facilitate camera-related processes and functions.

The memory 1150 can store other software instructions 1172 to facilitate other processes and functions, such as the security and/or authentication processes and functions as described with reference to FIGS. 1-9. For example, the software instructions can include instructions for performing voice authentication on a per application or per feature basis and for allowing a user to configure authentication requirements of each application or feature available on the device.

The memory 1150 can also store other software instructions (not shown), such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. An activation record and International Mobile Equipment Identity (IMEI) 1174 or similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions of the computing device 1100 can be implemented in hardware and/or in software, including in one or more signal processing and/or application specific integrated circuits.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer readable storage medium storing instructions which, when executed by a first device, cause a hardware processor of the first device to carry out operations comprising:
  receiving, by the first device, at least one wireless signal from a second device;
  transmitting, by the first device, at least one wireless signal to the second device;
  determining, by the first device, transit times of the at least one received wireless signal and the at least one transmitted wireless signal;
  determining, by the first device, one or more range measurements between the first device and the second device based at least in part on the transit times;
  determining, by the first device, an unlock decision based on a comparison between the one or more range measurements and a dynamic range threshold, wherein a value of the dynamic threshold is based on one or more characteristics of wireless communication employed between the computer system and the device, wherein the dynamic range threshold represents a distance; and
  causing, by at least the first device, the first device to unlock if the unlock decision is positive.

2. The non-transitory computer readable storage medium of claim 1, wherein the unlock decision is based at least in part on clustering of multiple range measurements.

3. The non-transitory computer readable storage medium of claim 1, wherein an accuracy of the one or more range measurements is based at least in part on an accuracy of the transit times.

4. The non-transitory computer readable storage medium of claim 1, wherein the one or more range measurements are determined by a wireless controller of the first device.

5. The non-transitory computer readable storage medium of claim 1, the operations further comprising:
   determining, by the first device, that the second device is within a threshold range of the first device; and
   determining, by the first device, that the unlock decision is positive.

6. The non-transitory computer readable storage medium of claim 1, wherein the unlock decision is based at least in part on one or more of a type of the first device, a type of the second device, a count of wireless signals received by the first device, a degree of conformity of the one or more range measurements to a model of range data, and one or more characteristics of an environment in which the first device and the second device are located.

7. The non-transitory computer readable storage medium of claim 1, the operations further comprising filtering the at least one wireless signal received by the first device by sequential filters, wherein the at least one wireless signal received by the first device is pre-filtered before being filtered and the pre-filtering removes outlier wireless signals of the at least one wireless signal.

8. The non-transitory computer readable storage medium of claim 1, wherein the one or more range measurements are filtered by a batch filter and one or more characteristics of the batch filter are based on experimental data obtained from one or both of the first device and the second device and the experimental data comprises a distribution of distance measurements between the first device and the second device.

9. The non-transitory computer readable storage medium of claim 8, wherein one or more characteristics of the batch filter are modeled to minimize one or both of false positive unlock decisions and false negative unlock decisions and are modeled based on an assumption that the one or more range measurements comprise at least a predetermined number of range measurements.

10. The non-transitory computer readable storage medium of claim 8, wherein the one or more characteristics of the batch filter are modeled according to a maximum likelihood estimation methodology.

11. The non-transitory computer readable storage medium of claim 8, wherein the one or more characteristics of the batch filter are modeled according to a generalized extreme value methodology.

12. The non-transitory computer readable storage medium of claim 1, wherein a first data packet is received via the at least one wireless signal.

13. The non-transitory computer readable storage medium of claim 12, wherein the first data packet is encrypted according to a first encryption sequence in a plurality of encryption sequences.

14. The non-transitory computer readable storage medium of claim 13, wherein a second data packet is received via the at least one wireless signal.

15. The non-transitory computer readable storage medium of claim 14, wherein the second data packet is encrypted according to a second encryption sequence in the plurality of encryption sequences.

16. A computer system comprising:
   a computer readable storage device storing computer executable instructions; and
   a hardware processor configured to, in response to executing the computer executable instructions, carry out operations comprising:
   receiving at least one wireless signal from a device,
   transmitting at least one wireless signal to the device,
   determining transit times of the at least one received wireless signal and the at least one transmitted wireless signal,
   determining one or more range measurements between the computer system and the device based at least in part on the transit times,
   determining an unlock decision based on a comparison between the one or more range measurements and a dynamic range threshold, wherein a value of the dynamic range threshold is based on one or more characteristics of wireless communication employed between the computer system and the device, wherein the dynamic range threshold represents a distance; and
   causing the computer system to unlock if the unlock decision is positive.

17. The computer system as in claim 16, wherein a value of the dynamic range threshold is based at least in part on a type of the computer system and a type of the device.

18. The computer system as in claim 17, wherein the value of the dynamic range threshold is based at least in part on a count of wireless signals received by the computer system.

19. The computer system as in claim 18, wherein the value of the dynamic range threshold is based at least in part on a degree of conformity of the one or more range measurements to a model of range data.

20. The computer system as in claim 18, wherein the value of the dynamic range threshold is based at least in part on one or more characteristics of wireless communication employed between the computer system and the device.

* * * * *